US008823705B2

(12) United States Patent
Ishibashi

(10) Patent No.: US 8,823,705 B2
(45) Date of Patent: Sep. 2, 2014

(54) IMAGE GENERATING APPARATUS AND IMAGE GENERATING METHOD FOR GENERATING IMAGES BY RENDERING A POLYGON

(75) Inventor: Yudai Ishibashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1127 days.

(21) Appl. No.: 12/594,856

(22) PCT Filed: Apr. 3, 2008

(86) PCT No.: PCT/JP2008/000860
§ 371 (c)(1),
(2), (4) Date: Oct. 6, 2009

(87) PCT Pub. No.: WO2008/126392
PCT Pub. Date: Oct. 23, 2008

(65) Prior Publication Data
US 2010/0066739 A1 Mar. 18, 2010

(30) Foreign Application Priority Data
Apr. 11, 2007 (JP) .................................. 2007-103625

(51) Int. Cl.
G06T 15/40 (2011.01)
G06T 15/30 (2011.01)

(52) U.S. Cl.
CPC .............. *G06T 15/30* (2013.01); *G06T 2210/08* (2013.01); *G06T 15/40* (2013.01)
USPC .......................................... 345/421; 345/420

(58) Field of Classification Search
CPC ............ G06T 15/30; G06T 15/40; G06T 1/60
USPC .......................................................... 345/421
See application file for complete search history.

(56) References Cited

U.S. PATENT DOCUMENTS 6,411,301 B1  6/2002 Parikh et al.
6,421,058 B2  7/2002 Parikh et al.
(Continued)

FOREIGN PATENT DOCUMENTS

JP  2001-084392  3/2001
JP  2001-195603  7/2001
(Continued)

OTHER PUBLICATIONS

International Search Report issued May 1, 2008 in International (PCT) Application No. PCT/JP2008/000860.
(Continued)

*Primary Examiner* — Kee M Tung
*Assistant Examiner* — Peter Hoang
(74) *Attorney, Agent, or Firm* — Wenderoth, Lind & Ponack, L.L.P.

(57) ABSTRACT

An image generating apparatus generates a computer graphics image by rendering a polygon, and includes a coordinate data loading unit which loads coordinate data in vertex data of a vertex of the polygon, a coordinate transformation unit which transforms a coordinate of the loaded coordinate data into a coordinate in a different coordinate system, and a polygon removal determining unit which determines whether the polygon is to be rendered or not, using transformed coordinate data obtained through the transformation. A vertex removal determining unit determines the vertex to be valid, a form data loading unit loads the form data corresponding to only the vertex that is determined to be valid, and a polygon rendering unit renders the polygon using the loaded form data and the transformed coordinate data.

11 Claims, 12 Drawing Sheets

(56) References Cited

U.S. PATENT DOCUMENTS

| | | | |
|---|---|---|---|
| 6,424,348 B2 | 7/2002 | Parikh et al. |
| 6,452,600 B1 | 9/2002 | Parikh et al. |
| 6,456,290 B2 | 9/2002 | Parikh et al. |
| 6,466,218 B2 | 10/2002 | Parikh et al. |
| 6,489,963 B2 | 12/2002 | Parikh et al. |
| 6,580,429 B1 | 6/2003 | Moriwaki et al. |
| 6,580,430 B1 | 6/2003 | Hollis et al. |
| 6,606,689 B1 | 8/2003 | Cheng et al. |
| 6,609,977 B1 | 8/2003 | Shimizu et al. |
| 6,618,048 B1 | 9/2003 | Leather |
| 6,636,214 B1 | 10/2003 | Leather et al. |
| 6,639,595 B1 | 10/2003 | Drebin et al. |
| 6,664,958 B1 | 12/2003 | Leather et al. |
| 6,664,962 B1 | 12/2003 | Komsthoeft et al. |
| 6,697,074 B2 | 2/2004 | Parikh et al. |
| 6,700,586 B1 | 3/2004 | Demers |
| 6,707,458 B1 | 3/2004 | Leather et al. |
| 6,717,577 B1 | 4/2004 | Cheng et al. |
| 6,811,489 B1 | 11/2004 | Shimizu et al. |
| 6,825,851 B1 | 11/2004 | Leather |
| 6,867,781 B1 | 3/2005 | Van Hook et al. |
| 6,937,245 B1 | 8/2005 | Van Hook et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,061,502 B1 | 6/2006 | Law et al. |
| 7,071,945 B2 | 7/2006 | Parikh et al. |
| 7,075,545 B2 | 7/2006 | Van Hook et al. |
| 7,106,324 B1 | 9/2006 | Takahashi |
| 7,134,960 B1 | 11/2006 | Shimizu et al. |
| 7,176,919 B2 | 2/2007 | Drebin et al. |
| 7,184,059 B1 | 2/2007 | Fouladi et al. |
| 7,196,710 B1 | 3/2007 | Fouladi et al. |
| 7,205,999 B2 | 4/2007 | Leather |
| 7,307,638 B2 | 12/2007 | Leather et al. |
| 7,317,459 B2 | 1/2008 | Fouladi et al. |
| 7,522,170 B2 | 4/2009 | Parikh et al. |
| 7,538,772 B1 | 5/2009 | Fouladi et al. |
| 7,576,748 B2 | 8/2009 | Van Hook et al. |
| 2002/0057275 A1 | 5/2002 | Parikh et al. |
| 2003/0052887 A1 | 3/2003 | Parikh et al. |
| 2004/0135787 A1 | 7/2004 | Parikh et al. |
| 2005/0046639 A1 | 3/2005 | Leather |
| 2005/0162436 A1 | 7/2005 | Van Hook et al. |
| 2005/0237337 A1 | 10/2005 | Leather et al. |
| 2006/0125825 A1 | 6/2006 | Law et al. |
| 2006/0152507 A1* | 7/2006 | Lee et al. ............... 345/423 |
| 2006/0197768 A1 | 9/2006 | Van Hook et al. |
| 2006/0250403 A1 | 11/2006 | Parikh et al. |
| 2007/0070083 A1 | 3/2007 | Fouladi et al. |
| 2007/0165043 A1 | 7/2007 | Fouladi et al. |
| 2007/0197291 A1 | 8/2007 | Shimizu et al. |
| 2008/0094412 A1* | 4/2008 | Jiao et al. ............... 345/621 |
| 2009/0225094 A1 | 9/2009 | Fouladi et al. |

FOREIGN PATENT DOCUMENTS

| | | |
|---|---|---|
| JP | 2001-209369 | 8/2001 |
| JP | 2004-102841 | 4/2004 |

OTHER PUBLICATIONS

Computer Graphics, Editorial committee of "Computer Graphics", CG-ARTS Society, p. 34, Line 8 to p. 38, and p. 100, Line 7 to p. 102, Line 2, Sep. 17, 2004 and its English translation.

* cited by examiner

IMAGE GENERATING APPARATUS AND IMAGE GENERATING METHOD FOR GENERATING IMAGES BY RENDERING A POLYGON

BACKGROUND OF THE INVENTION

1. Technical Field

The present invention relates to computer graphics techniques, and relates to an image generating apparatus which generates computer graphics images and an image generating method.

2. Background Art

The process for generating computer graphics (CG) images causes a heavy computational load. For this reason, the information processing apparatus which performs a process for generating images in real time includes an image generating apparatus (graphics processing unit) dedicated to the process for generating images, in addition to the central processing unit (CPU).

FIG. 1 is a flowchart showing general process of the image generating method by a conventional image generating apparatus.

The conventional image generating apparatus in general first loads vertex data of an input polygon model from an information storage device (memory) (S101). Note that the vertex data is composed of the coordinate data indicating a position of a vertex and form data which includes data other than the coordinate data. Next, the coordinate of the coordinate data in the vertex data is transformed to a world coordinate (S102). Furthermore, the coordinate in the world coordinate is transformed to a display coordinate (S103). Subsequently, using the transformed coordinate data, for each polygon composed of the loaded vertex data, it is determined whether the polygon rendering is valid or not by clipping determination for determining whether or not the polygon is in a visible space or by culling determination for determining whether or not the polygon is facing, from the viewpoint, a plane that should be displayed (S104). Only the polygons that have been determined to be valid are rendered using the loaded vertex data (S105). It is determined whether or not processing for all of the polygons are complete (S106), and when the processing is not complete ("Continue" in S106), each process (S101 to S105) is repeated. When the processing for all of the polygons are complete ("Complete" in S106), the image generating apparatus outputs the rendered image.

Examples of the image generating apparatus include the techniques disclosed in Patent Reference 1 and Patent Reference 2.

Patent Reference 1 discloses a technique for non-interactive purposes where certain sequences to be skipped are determined in advance. The technique disclosed in Patent Reference 1 reduces data unnecessary for rendering in advance. This reduces the memory access amount for loading the data.

Patent Reference 2 discloses a technique where a data cache dedicated to load the input polygon data is provided. In the technique disclosed in Patent Reference 2, the vertex data loaded once is stored in the dedicated data cache, and thus the vertex data is not reloaded when the same vertex data is referred to. This reduces the memory access amount.

Patent Reference 1: Japanese Unexamined Patent Application Publication No. 2001-209369
Patent Reference 2: Japanese Unexamined Patent Application Publication No. 2001-195603
Non-Patent Reference 1: "Computer Graphics", Computer Graphics Arts Society Publishing (Page 34, Page 100)

SUMMARY OF THE INVENTION

However, with the conventional image generating apparatus, there is a problem that the memory access amount from the memory which holds the vertex data of input polygon model to the graphics processing unit increases, thereby pressing the memory bandwidth which is the maximum memory access data amount per unit time.

More specifically, with the conventional image generating apparatus, the coordinate data and form data of the vertices of the input polygon model are loaded from the memory to the graphics processing unit. Clipping determination and culling determination are subsequently performed. Accordingly, it is necessary to load all vertex data for the input polygon model regardless of whether the polygon rendering is valid or not. This increases the memory access amount from the memory to the graphics processing unit, pressing the memory bandwidth.

Note that, in the technique disclosed in Patent Reference 1, it is possible to reduce the amount of vertex data to be loaded. Accordingly, the problem is solved when the use is limited to non-interactive purposes. However, Patent Reference 1 has a problem that the technique cannot be used for CG processing for interactive purposes, where operations by a user are involved.

Furthermore, with the technique disclosed in Patent Reference 2, it is possible to reduce the memory access amount by not reloading vertex data when referring to the same vertex data. However, the technique is not sufficient for solving the problem since the vertex data is loaded at least once, regardless of whether the polygon rendering is valid or not.

As described above, there has been no method for solving the abovementioned problem, and it has been extremely difficult to render high-definition polygons having a number of input polygons using an information processing apparatus with a low memory bandwidth.

In response to the problem, it is an object of the present invention to provide an image generating apparatus which is applicable to CG processing for interactive purposes, and which can reduce the memory access amount when loading the vertex data of the input polygon model, and an image generating method.

In order to solve the abovementioned problem, the image generating apparatus according to the present invention is an image generating apparatus which generates a computer graphics image by rendering a polygon, the image generating apparatus including: a coordinate data loading unit which loads coordinate data in vertex data, the vertex data indicating information of a vertex composing the polygon, and the coordinate data indicating a position of the vertex; a coordinate transformation unit which transforms a coordinate of the coordinate data loaded by the coordinate data loading unit into a coordinate in a different coordinate system; a determining unit which determines whether the vertex composing the polygon is valid or not by determining whether the polygon is to be rendered or not, using transformed coordinate data transformed by the coordinate transformation unit; a form data loading unit which loads the form data indicating information other than the coordinate data in the vertex data corresponding to only the vertex that is determined to be valid by the determining unit; and a polygon rendering unit which renders the polygon using the form data loaded by the form data loading unit and the transformed coordinate data.

This allows loading of, only the form data necessary for rendering the polygon, whereas all of the form data in the vertex data was loaded conventionally. Furthermore, whether the polygon is rendered or not can be detected using the loaded coordinate data. Therefore, this is applicable to CG process for, not only for the non-interactive purposes, but also for the interactive purposes. Additionally, the memory access amount for loading the vertex data of the input polygon model can be reduced.

Furthermore, transforming the coordinate by the coordinate transformation unit, and determining the polygon and determining the vertex by the determining unit may be processed in a pipeline each time a piece of the coordinate data is loaded.

This allows, real-time, high-definition polygon rendering with a large number of input polygons by an information processing apparatus with a low memory bandwidth.

Furthermore, the determining unit may include: a polygon determining unit which determines, using the transformed coordinate data, whether the polygon is to be rendered or not, and to output a valid polygon flag indicating whether the polygon is to be rendered or not; and a vertex determining unit which determines whether the vertex is valid or not by performing a logical OR operation between valid polygon flags of a plurality of polygons sharing a common vertex.

Furthermore, the image generating apparatus may further include a first buffer which holds an intermediate result flag which is set, in advance to indicate that the vertex is invalid, in which the determining unit includes: a polygon determining unit configured to determine whether the polygon is to be rendered or not using the transformed coordinate data, and to output a valid polygon flag which indicates whether the polygon is to be rendered or not; and a vertex determining unit configured to determine whether the vertex is valid or not by performing a logical OR operation between the valid polygon flag and the intermediate result flag of the vertex composing the polygon corresponding to the valid polygon flag and by updating the intermediate result flag held in the first buffer.

This allows determining whether the polygon is valid or not by only performing the logical OR operation, and thus the process amount for determining the vertex can be reduced.

Furthermore, the vertex determining unit may perform a logical OR operation between the intermediate result flag and the valid polygon flag, and output a valid vertex flag indicating that the vertex is valid when a value of the intermediate result flag changes, and the form data loading unit may load the form data corresponding to the valid vertex flag, when the valid vertex flag is received.

This allows loading of the form data, each time the vertex is determined to be valid, corresponding to the vertex, and thus it is possible to reduce the memory bandwidth being pressed.

Furthermore, the vertex determining unit may stop performing the logical OR operation when the value of the intermediate result flag changes.

This prevents re-determination of the vertex on the vertex that has been determined to be valid once, and thus the process amount can be reduced.

Furthermore, the coordinate data loading unit may load the coordinate data from an area where only a plurality of pieces of the coordinate data is stored, and the form data loading unit may load the form data from an area where only a plurality of pieces of the form data is stored.

This allows the coordinate data which always needs to be entirely loaded and the form data which is loaded when necessary, to be stored separately. Accordingly, it is possible to prevent loading of the form data determined to be unnecessary when loading the vertex data by burst memory access where data in an area having successive memory addresses is loaded with one memory access, together with the coordinate data, and thereby increasing the memory access efficiency.

More specifically, the coordinate transformation unit may transform the coordinate of the coordinate data into a coordinate in the world coordinate system and in a display coordinate system, and the determining unit may determine whether the polygon is valid or not by performing at least one of a clipping determination using the transformed coordinate data transformed into the coordinate in the world coordinate system and a culling determination using the transformed coordinate data transformed into the coordinate in the display coordinate system, and may determine the vertex to be valid, the vertex composing the polygon that is determined to be valid.

Furthermore, the present invention can be implemented, not only as an image generating apparatus, but also as an image generating method including each processing unit configuring the image generating apparatus as a step.

Furthermore, the present invention can also be implemented as an integrated circuit, which is an integrated circuit which generates a computer graphics image by rendering a polygon, the integrated circuit including: a coordinate data loading unit which loads coordinate data in vertex data, the vertex data indicating information of a vertex composing the polygon, and the coordinate data indicating a position of the vertex; a coordinate transformation unit which transforms a coordinate of the coordinate data loaded by the coordinate data loading unit into a coordinate in a different coordinate system; a determining unit which determines whether the vertex composing the polygon is valid or not by determining whether the polygon is to be rendered or not, using transformed coordinate data transformed by the coordinate transformation unit; a form data loading unit which loads the form data indicating information other than the coordinate data in the vertex data corresponding to only the vertex that is determined to be valid by the determining unit; and a polygon rendering unit which renders the polygon using the form data loaded by the form data loading unit and the transformed coordinate data.

According to the present invention, it is possible to significantly reduce the memory access amount for loading the vertex data of the input polygon model from the memory to the graphics processing unit, and thereby, real-time, high-definition polygon rendering with a large number of input polygons can be achieved by an information processing apparatus with a low memory bandwidth

NUMERICAL REFERENCES

Figure 1:
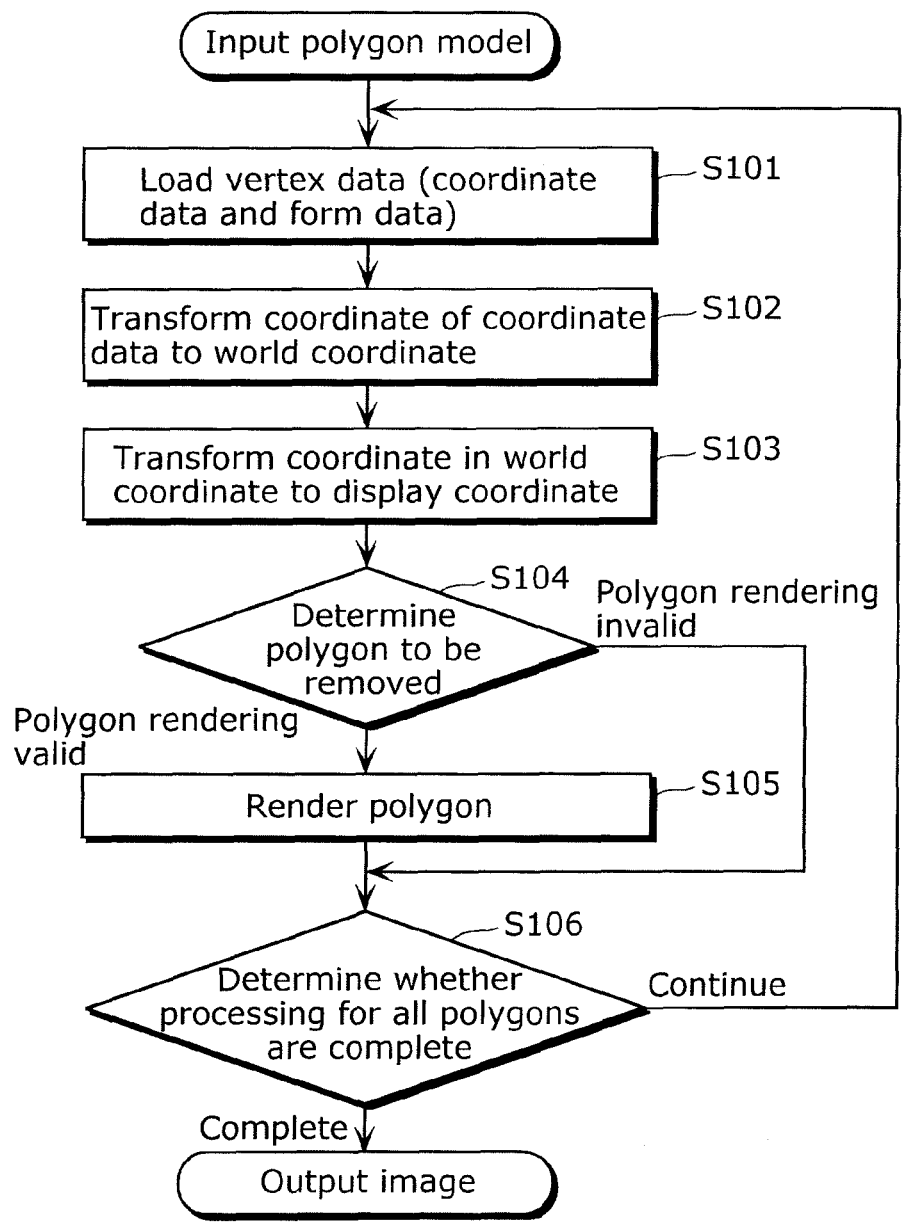
FIG. 1 is a flowchart indicating the operations of the conventional image generating apparatus.

100 Image generating apparatus
101 Host interface
102 Control unit
103 Coordinate data loading unit
104 Coordinate transformation unit
105 Polygon removal determining unit
106 Vertex removal determining unit
107 Form data loading unit
108 Polygon rendering unit
109 Memory interface
110 Transformed coordinate buffer
111 Vertex removal determination buffer
200, 1008 Memory
201 Input data
202 Rendering instruction list
203 Vertex data list
204 Rendering instruction
205, 501, 701, 901 Coordinate data list
206, 502, 702, 902 Form data list
207, 504, 704, 904 Coordinate data
208 Form data
301 Viewpoint
302 Viewing volume
303 Displayed surface
304, 305, 306 Polygon
401 Polygon strip
402, 602, 802 Time chart
503, 703, 903 Output image
505, 506, 510, 705, 706, 707, 712, 905, 906, 910 Transformed coordinate data
507, 508, 708, 710, 907 Valid polygon rendering flag
509, 711, 909 Valid vertex flag
511, 713, 911, Vertex data
601 Polygon fan
709, 908 Intermediate result flag
801 Polygon mesh
1000 Information processing apparatus
1001 Integrated circuit
1002 CPU
1003 Graphics processing unit
1004 Memory controller
1005 Display controller
1006 CPU bus
1007 Memory bus
1009 Display

DETAILED DESCRIPTION OF THE INVENTION

The following is the description of an embodiment of the present invention with reference to the drawings.

The image generating apparatus according to this embodiment determines whether a vertex is necessary for rendering a polygon or not, loads form data corresponding to the vertices determined as necessary, and generates a computer graphics image by rendering the polygon using the loaded data.

Figure 2:
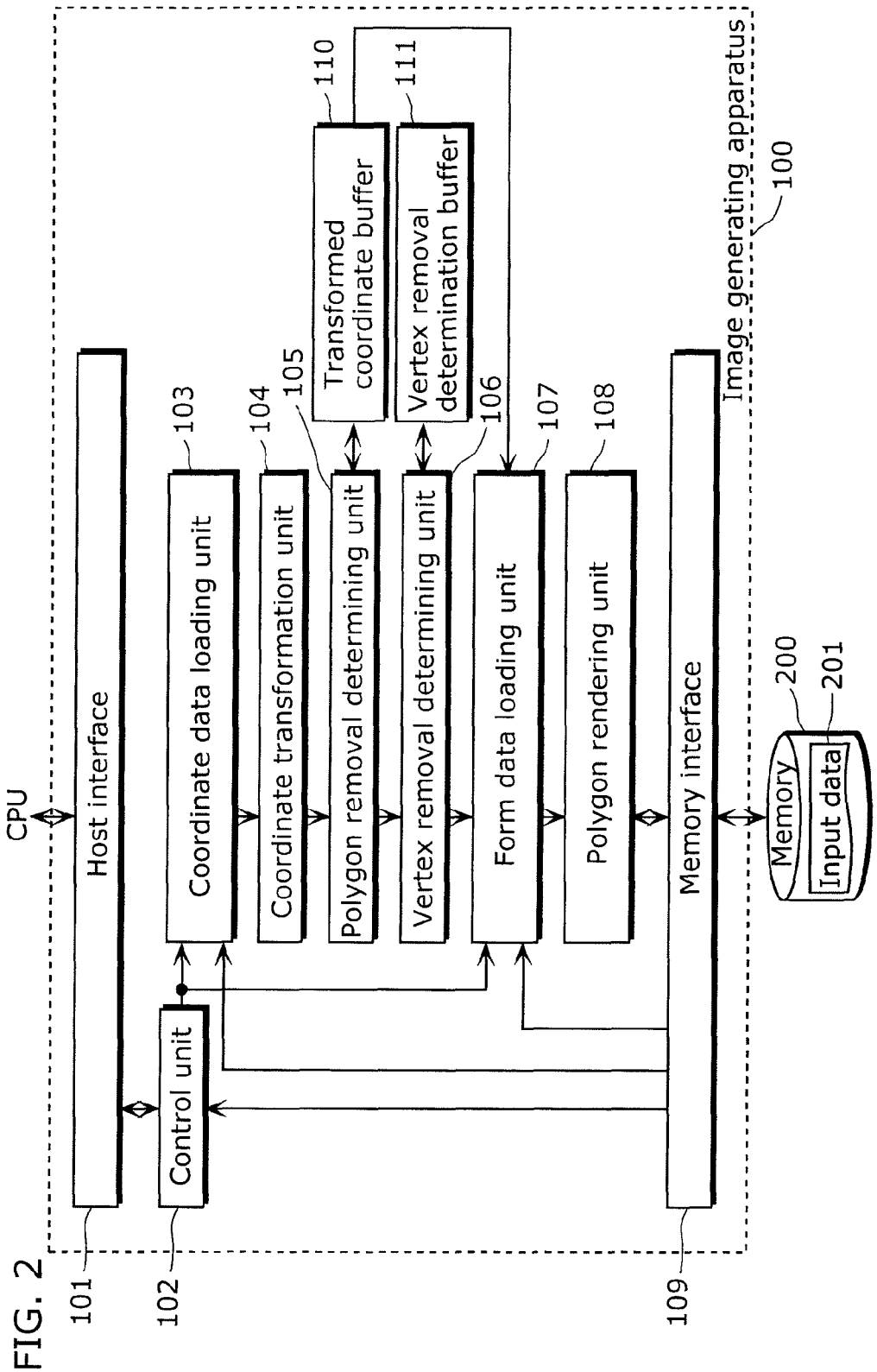
FIG. 2 is a block diagram indicating the structure of the image generating apparatus according to the embodiment.

FIG. 2 is a block diagram indicating the structure of the image generating apparatus according to this embodiment. The image generating apparatus 100 in FIG. 1 is an apparatus which renders polygons by reading necessary data from the memory 200 which holds the input data 201 related to polygon rendering. First, the input data 201 stored in the memory 200 is described.

Figure 3:
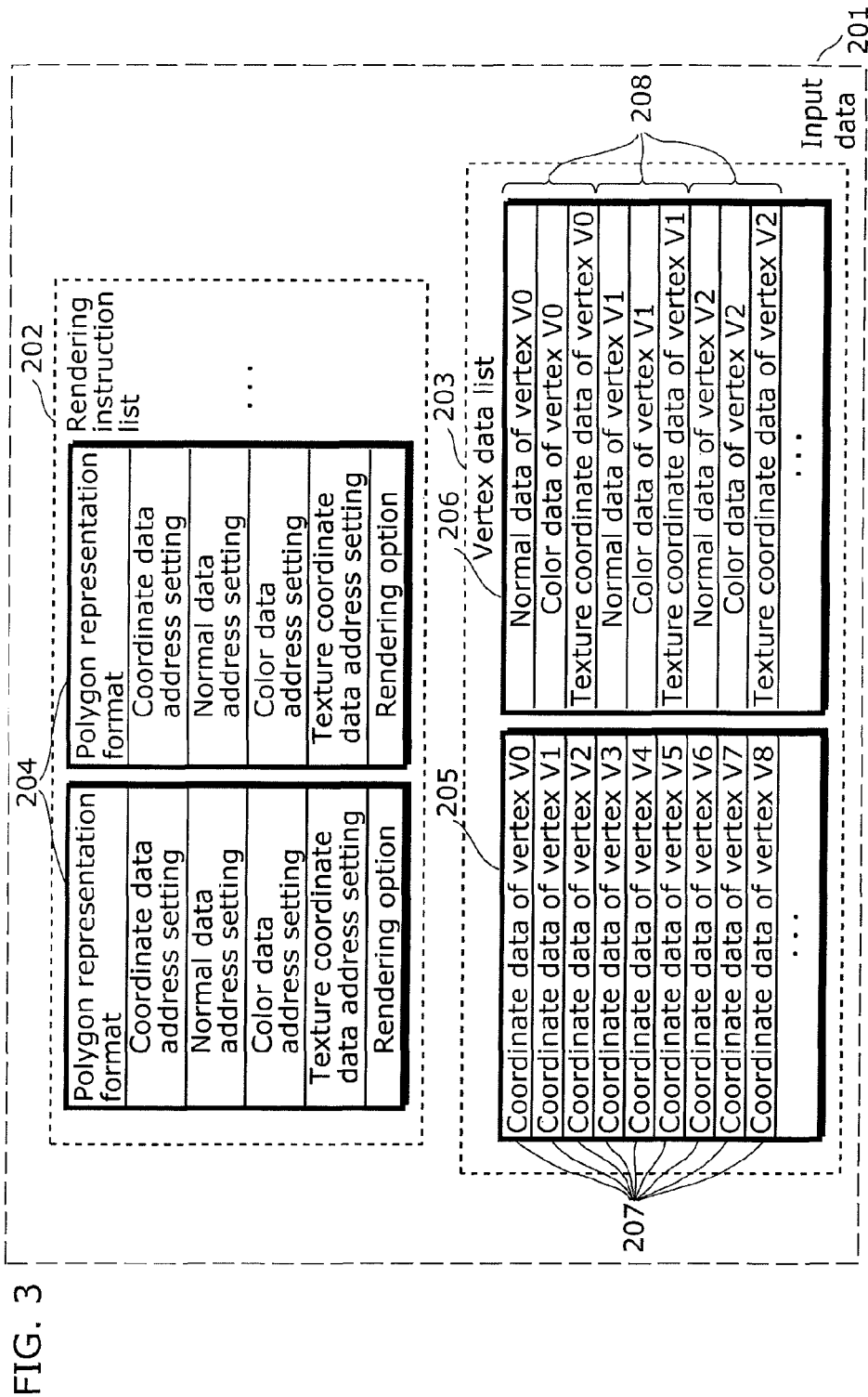
FIG. 3 indicates input data to the image generating apparatus according to the embodiment.

FIG. 3 indicates the input data to the image generating apparatus according to this embodiment. As shown in FIG. 3, the input data 201 includes the rendering instruction list 202 and the vertex data list 203 of the input polygon model.

The rendering instruction list 202 includes the rendering instruction 204 indicating various types of information related to the polygon rendering instruction. As shown in FIG. 3, the rendering instruction 204 indicates the representational form of the input polygon (such as polygon strip, polygon fan, and polygon mesh), loading setting of each parameter (address setting of each data), rendering options, and others.

The vertex data list 203 is a list of vertex data of the input polygon model, and includes the coordinate data list 205 and the form data list 206. Note that, the vertex data is data indicating the information of the vertices which composes the polygon, and includes the coordinate data and the form data.

As shown in FIG. 3, the vertex data list 203 may be divided into the coordinate data list 205 and the form data list 206, and may be stored in separate memory areas respectively. This prevents, the form data that is determined to be unnecessary from being loaded together with the coordinate data when loading the vertex data list 203 by burst memory access where data in an area having successive memory addresses is loaded with one memory access, and thereby increasing the memory access efficiency.

The coordinate data list 205 is a list of the coordinate data 207 which indicates the position of each vertex of the input polygon model.

The form data list 206 is a list of the form data 208 which indicates information other than the coordinate data of each vertex. FIG. 3 shows, as an example, the normal data, color data, and texture coordinate data of each vertex.

The image generating apparatus 100 in FIG. 2 includes the host interface 101, the control unit 102, the coordinate data loading unit 103, the coordinate transformation unit 104, the polygon removal determining unit 105, the vertex removal determining unit 106, the form data loading unit 107, the polygon rendering unit 108, the memory interface 109, the transformed coordinate buffer 110, and the vertex removal determination buffer 111.

The host interface 101 transmits the instruction to start rendering, which is input from the CPU, to the control unit 102.

When receiving the instruction to start rendering, the control unit 102 loads the rendering instruction list 202 from the memory interface 109 via the memory bus, and transmits the rendering instruction 204 to the coordinate data loading unit 103 and the form data loading unit 107.

The coordinate data loading unit 103 accesses the coordinate data list 205 in the vertex data list 203 according to the rendering instruction 204, loads the coordinate data 207 for each vertex, and outputs the coordinate data 207 to the coordinate transformation unit 104.

The coordinate transformation unit 104 transforms the coordinate of the input coordinate data 207, and outputs the transformed coordinate data to the polygon removal determining unit 105. Transforming coordinates is to transform the coordinate data 207 to a world coordinate and a display coordinate.

The polygon removal determining unit 105 generates, using the transformed coordinate data, a flag (hereinafter referred to as a valid polygon rendering flag) indicating whether the polygon is to be rendered or not; more specifically, whether the polygon rendering is valid or not. More specifically, the polygon removal determining unit 105 first stores the transformed coordinate data to the transformed coordinate buffer 110. This is because a plurality of transformed coordinate data is necessary for determining whether the polygon rendering is valid or not (hereinafter referred to as polygon removal determination). The transformed coordinate data of the vertices composing the polygon to be determined is obtained from the transformed coordinate buffer 110, and a polygon to be removed is determined. Subsequently, the polygon removal determining unit 105 generates the valid polygon rendering flag based on the determination result, and outputs the valid polygon rendering flag to the vertex removal determining unit 106. The valid polygon rendering flag indicates true when the corresponding polygon is valid, and false when the corresponding polygon is invalid. Specific examples of polygon removal determination are described later for each representation form of the polygons.

The vertex removal determining unit 106 generates a flag indicating whether the vertex is valid or not (hereinafter referred to as the valid vertex flag), using a valid polygon rendering flag. More specifically, first, the vertex removal determining unit 106 stores the valid polygon rendering flag output from the polygon removal determining unit 105 or a flag (hereinafter referred to as an intermediate flag) indicating intermediate result of vertex removal determination generated using the valid polygon rendering flag in the vertex removal determination buffer 111. This is because a plurality of valid polygon rendering flags or intermediate result flags are necessary for determining vertex to be removed. The vertex removal determining unit 106 subsequently obtains the valid polygon rendering flag of the polygon including the vertices to be determined or intermediate result flag of the vertices to be determined from the vertex removal determination buffer 111, and determines whether the vertices are valid or not. Subsequently, the vertex removal determining unit 106 generates the valid vertex flag based on the determination result, and outputs the valid vertex flag to the form data loading unit 107. The valid vertex flag and the intermediate result flag indicate true if the corresponding vertex is valid and false if the corresponding vertex is invalid.

The form data loading unit 107 accesses the form data list 206 in the vertex data list 203 according to the rendering instruction 204, and loads the form data 208. More specifically, the form data loading unit 107 loads the form data only for the valid vertex data by referring to the valid vertex flag output from the vertex removal determining unit 106 and outputs the form data together with the transformed coordinate data to the polygon rendering unit 108.

The polygon rendering unit 108 renders the polygon using the input vertex data (the transformed coordinate data and the form data), and generates a polygon image. Polygon rendering is performed as general processing used for computer graphics processing. The polygon rendering unit 108 outputs the generated polygon image to the memory via the memory interface 109.

The memory interface 109 exchanges data between each processing unit included in the image generating apparatus 100 and the memory 200.

The transformed coordinate buffer 110 holds the transformed coordinate data transformed by the coordinate transformation unit 104. The transformed coordinate buffer 110 is a buffer for temporarily holding the transformed coordinate data, since the polygon to be determined by the polygon removal determining unit 105 is composed of a plurality of vertices (three vertices in this embodiment). Furthermore, the transformed coordinate buffer 110 is also a buffer for holding the transformed coordinate data, since the transformed coordinate data is also used for rendering performed by the polygon rendering unit 108.

The vertex removal determination buffer 111 holds the valid polygon rendering flag or the intermediate result flag.

Figure 4:
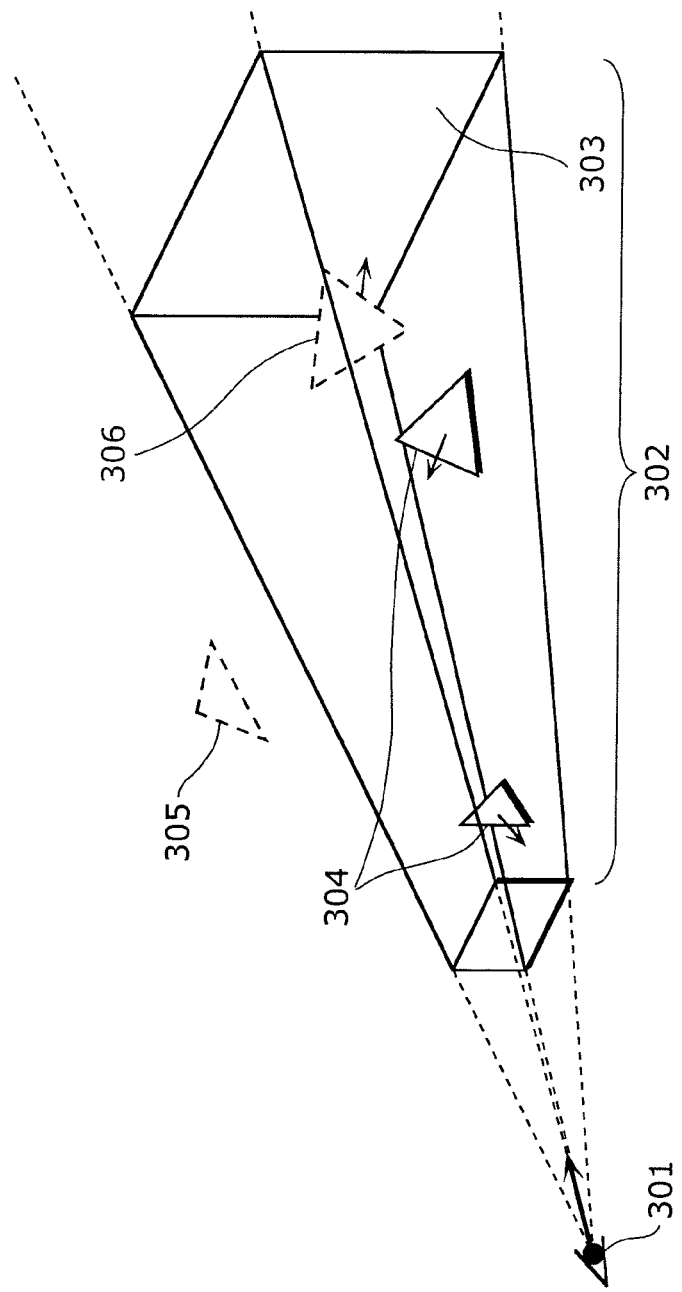
FIG. 4 indicates polygon removal determination.

The following describes the polygon removal determination by the polygon removal determining unit 105. FIG. 4 is for describing polygon removal determination. The polygon removal determination is a process for determining whether a polygon composed of a plurality of vertices are used or not when generating an image.

When determining the polygon to be removed, the coordinate data transformed to a coordinate system where the viewpoint 301 is the origin (display coordinate system). The clipping determination and the culling determination serve as the polygon removal determination.

The clipping determination is a process for determining whether the polygon is in the viewing volume 302, the hexahedron indicating visible space, as disclosed in the method in Non-patent Reference 1. Polygon rendering is invalid when all of the vertices composing the polygon are outside the viewing volume 302. For example, rendering of the polygon entirely outside the viewing volume 302 such as the polygon 305 is determined to be invalid by the clipping determination.

On the other hand, the culling determination is for determining whether the polygon in the viewing volume 302 is facing the viewpoint or not. The culling determination can determine whether the polygon is facing the viewpoint or not by calculating a surface normal vector from the coordinates of the vertices composing the polygon and checking the sign of the inner product of the surface normal vector and the viewpoint directional vector, as disclosed in the method in Non-patent Reference 1. Polygon rendering is determined to be invalid if the polygon is facing backwards from the viewpoint 301. For example, rendering of the polygon whose polygon surface is facing backwards from the viewpoint 301 such as the polygon 306 is determined to be invalid by the culling determination.

Only the polygon such as the polygon 304, which is not determined to be invalid in the clipping determination and the culling determination is determined to be a valid polygon which can be projected on the display surface 303 and rendered.

The following describes the operations of the image generating apparatus according to this embodiment.

Figure 5:
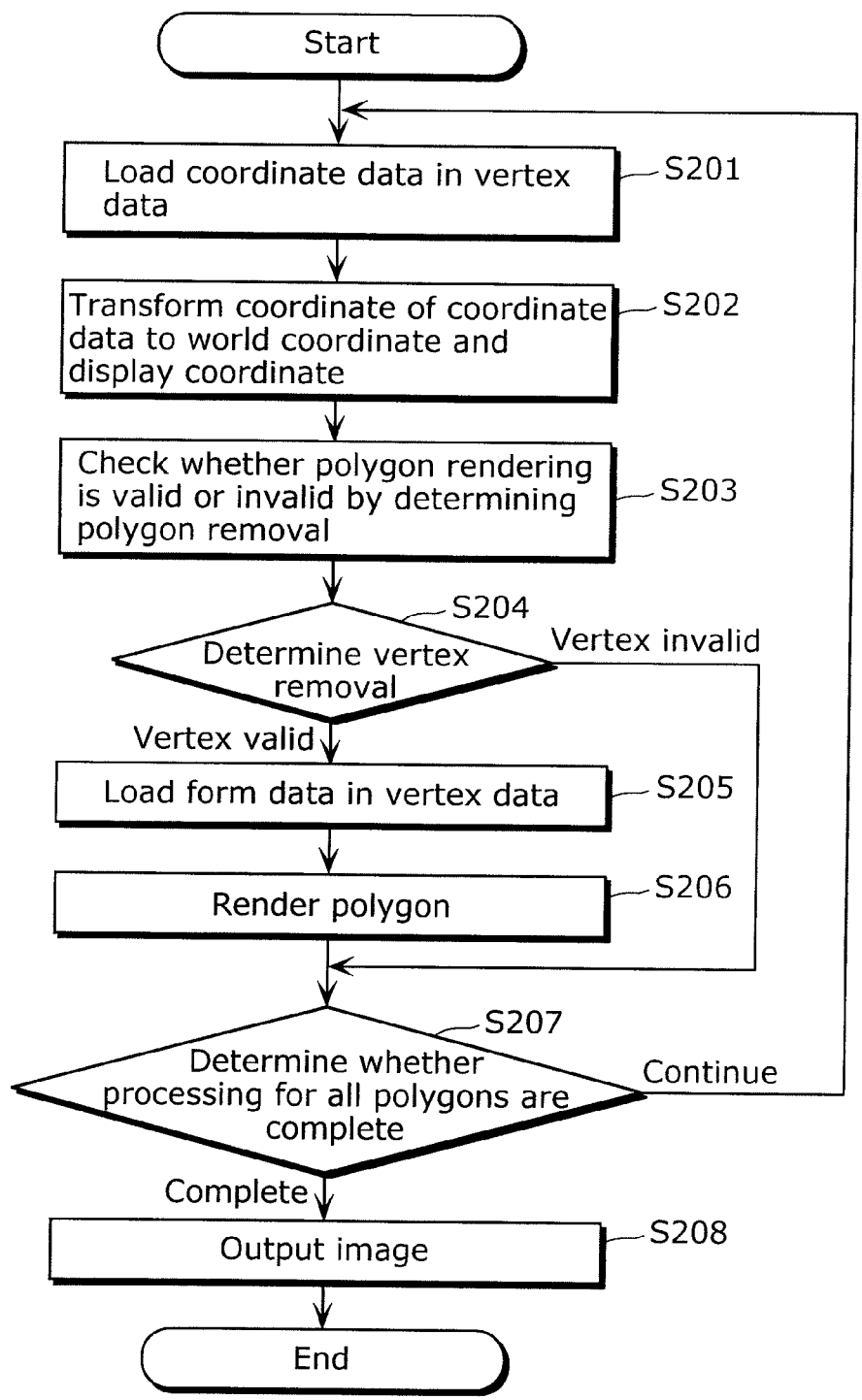
FIG. 5 is a flowchart indicating operations of the image generating apparatus according to the embodiment.

FIG. 5 is a flowchart indicating the operations of the image generating apparatus according to this embodiment. The image generating process according to this embodiment starts when the control unit 102 receives a rendering instruction from the CPU via the host interface 101.

The coordinate data loading unit 103 loads the coordinate data in the vertex data of the input polygon model, based on the instruction from the control unit 102 (S201). The coordinate transformation unit 104 transforms the loaded coordinate data to a world coordinate and a display coordinate (S202). The polygon removal determining unit 105 determines the polygon to be removed using the transformed coordinate data of the vertices composing the polygon to be determined (S203). The vertex removal determining unit 106 determines the vertex to be removed using the result of polygon removal determination of the polygon including the vertex to be determined (S204). When one or more polygon rendering is determined to be valid in the polygon removal determination result of all of the polygons including the vertex to be determined, the vertex to be determined is determined to be valid vertex data ("vertex valid" in S204). When all of polygon rendering is determined to be invalid, the polygon removal determining unit 105 determines the vertex data to be invalid ("vertex invalid" in S204). The form data loading unit 107 refers to the result of vertex removal determination generated by the vertex removal determining unit 106, and loads the form data only for the vertex data determined to be valid (S205). The form data loading unit 107 outputs the loaded form data together with the transformed coordinate data of the appropriate vertex to the polygon rendering unit 108. The polygon rendering unit 108 renders polygons using the vertex data received from the form data loading unit 107 (the transformed coordinate data and form data) (S206). It is determined whether or not the processes are complete for all of the polygons (S207), and each process (S201 to S206) is repeated when the processes are not complete ("continue" in S207). When it is determined that the processes are complete for all of the polygons ("complete" in S207), the image generating apparatus 100 outputs the rendered image (S208).

As described above, while the image generating apparatus according to the embodiment loads all of the coordinate data in the vertex data, the image generating apparatus loads only the form data corresponding to the vertex determined to be the valid vertex. This reduces the amount of memory access for loading the input polygon data. Furthermore, the image generating apparatus according to this embodiment can be applied for interactive purposes since it is determined whether the vertex is necessary for rendering the polygon or not, in parallel with the image rendering.

The following is a more specific description of the image generating apparatus according to this embodiment based on the representation forms of polygons. Here, description shall be made for the three representation forms, namely, the polygon strip, the polygon fan and the polygon mesh.

(Polygon Strip Format)

First, the following describes a case where the input polygon model is composed in the polygon strip format.

Figure 6:
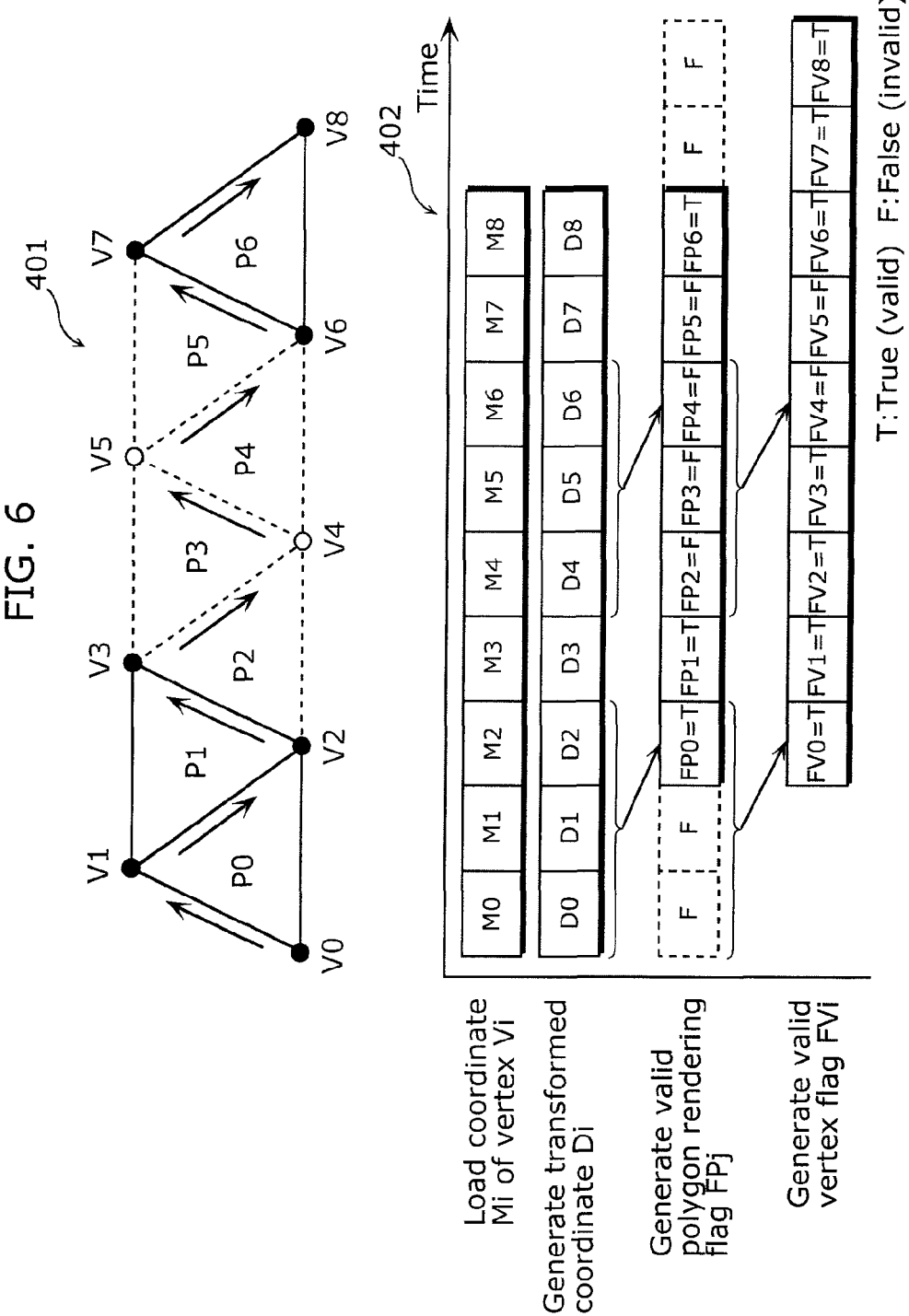
FIG. 6 indicates the process flow in the polygon strip format.

FIG. 6 shows the process flow when the input polygon model is composed in the polygon strip format. The polygon strip format is a format where the polygons are successively rendered while sharing the vertices. As shown in FIG. 6, the polygon Pj (j=0 to 6) of the polygon strip 401 is composed of three vertices, namely, the vertex Vj, Vj+1, and Vj+2. Furthermore, the vertex data of the polygon strip 401 is specified in the order of V0→V1→V2→V3→V4→V5→V6→V7→V8. Note that, in the example shown in FIG. 6, it is assumed that the polygons P0, P1, and P6 are valid polygons.

The time chart 402 is a time chart which indicates the process flow from loading the coordinate data to generating the valid vertex flag (vertex determination). The following describes the process flow with the polygon strip format with reference to the time chart 402.

The coordinate data loading unit 103 sequentially loads, in the order specified by the vertex data, the coordinate data Mi (i=0 to 8) in the vertex data, and outputs the coordinate data Mi to the coordinate transformation unit 104. The coordinate transformation unit 104 transforms the coordinate of the coordinate data Mi of the vertex Vi received from the coordinate data loading unit 103. With this, the coordinate transformation unit 104 outputs the transformed coordinate data Di to the polygon removal determining unit 105. The polygon removal determining unit 105 causes the transformed coordinate buffer 110 to hold the input transformed coordinate data Di.

The polygon removal determining unit 105 determines polygons to be removed in the order of P0→P1→P2→P3→P4→P5→P6. When determining whether the polygon Pj is removed or not, the polygon removal determining unit 105 causes the transformed coordinate buffer 110 to hold the transformed coordinate data generated by the coordinate transformation unit 104 until the transformed coordinate data Dj, Dj+1, and Dj+2 of the vertices Vj, Vj+1, and Vj+2 composing the polygon Pj are all calculated. The polygon removal determining unit 105 determines the polygons to be removed using the transformed coordinate data when all of the transformed coordinate data is calculated, and generates the valid polygon rendering flag FPj (true if the polygon is valid, false if the polygon is invalid).

The vertex removal determining unit 106 determines the vertex to be removed in the order of V0→V1→V2→V3→V4→V5→V6→V7→V8. The vertex removal determining unit 106 performs logical OR operation between the valid polygon rendering flags FPi−2, FPi−1, and FPi (the valid polygon rendering flag of the polygon number that does not exist is considered as false) of the polygons Pi−2, Pi−1, and Pi which include the vertex Vi, when determining the vertex Vi is to be removed or not. More specifically, the valid vertex flag FVi which indicates whether the vertex Vi is valid or not is calculated based on the following equation 1.

$$FVi = FPi-2 \| FPi-1 \| FPi \quad \text{(Equation 1)}$$

Note that the vertex removal determining unit 106 causes the vertex removal determination buffer 111 to hold the valid polygon rendering flag generated by the polygon removal determining unit 105 or its intermediate logical OR, until the valid polygon rendering flags FPi−2, FPi−1, and FPi are calculated. For example, the vertex V2 is determined to be valid vertex data since polygon rendering is valid for the polygons P0, P1, among the polygons P0, P1, and P2 which include the vertex V2. On the other hand, the vertex V4 is determined to be invalid vertex data since polygon rendering is invalid for the polygon P2, P3, and P4 which include the vertex V4.

The form data loading unit 107 loads the form data of the vertices that has been determined to be valid by the vertex removal determining unit 106, namely, the vertices V0, V1, V2, V3, V6, V7, and V8 in the order of vertex removal determination, and outputs the form data together with the transformed vertex data of the appropriate vertices to the polygon rendering unit 108. The polygon rendering unit 108 receives the vertex data and renders the polygons.

Note that the above process is performed in the pipeline. More specifically, as shown in the time chart 402 in FIG. 6, the coordinate data is loaded, starting from the vertex V0, and the transformed coordinate data is generated by transforming the loaded coordinate data. The polygon removal determination and the vertex removal determination can be performed only after the transformed coordinate data D2 corresponding to the vertex V2 is generated. Subsequently, the coordinate transformation, the polygon removal determination, and the vertex removal determination are performed every time the coordinate data is loaded. The following describes the processes being performed in the pipeline, based on the data flow in each processing unit in the image generating apparatus 100 according to this embodiment.

Figure 7:
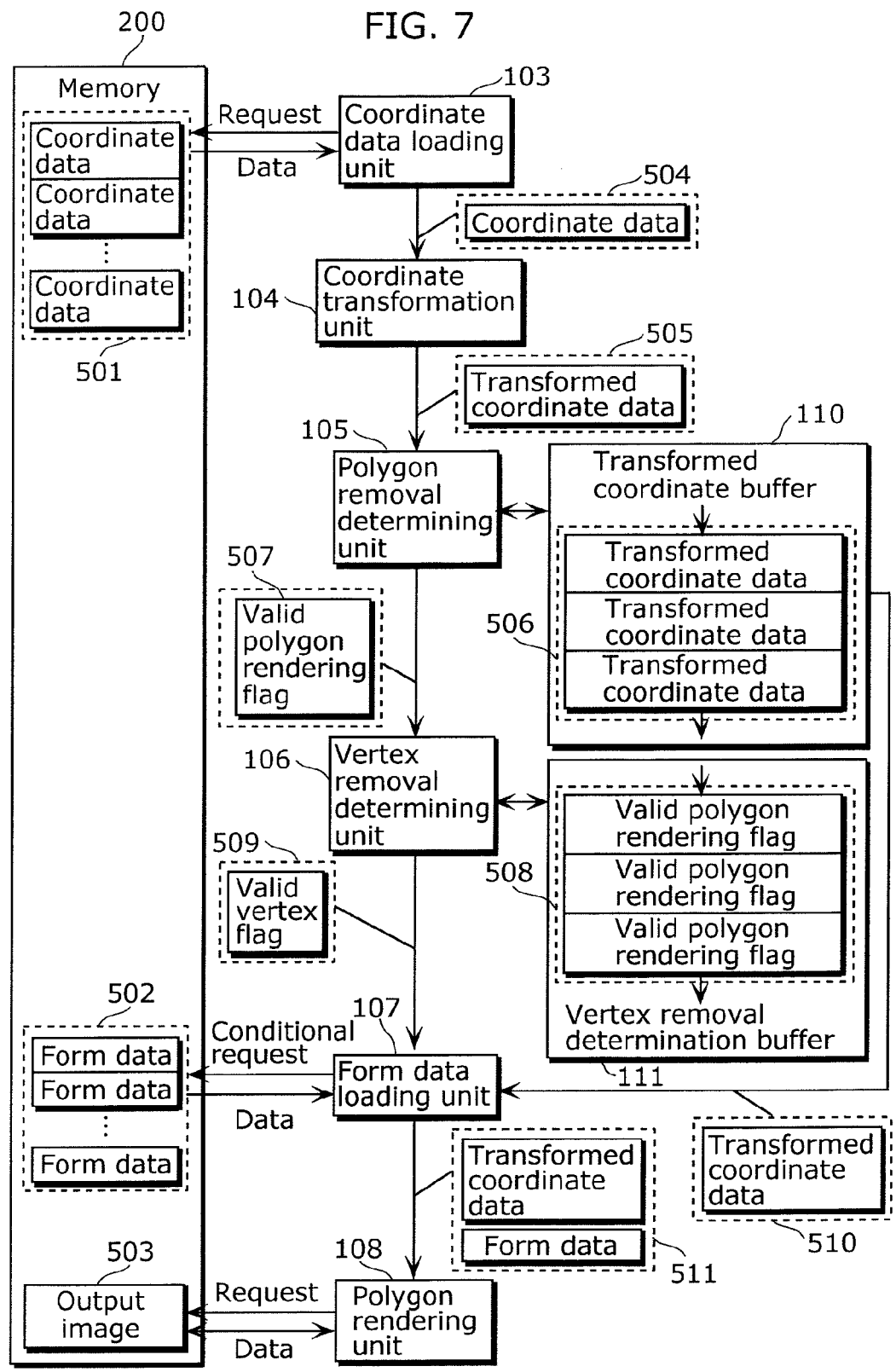
FIG. 7 indicates the data flow in each processing unit in the image generating apparatus compliant with the polygon strip format.

FIG. 7 shows the data flow in each processing unit in the image generating apparatus compliant with the polygon strips format. As shown in FIG. 7, it is assumed that the coordinate data list 501 and the form data list 502 of the polygon strip are provided on the memory 200. The memory 200 also holds the output image 503 rendered by the polygon rendering unit 108.

The coordinate data loading unit 103 accesses the coordinate data list 501 on the memory 200, sequentially loads the coordinate data 504, and outputs the coordinate data 504 to the coordinate transformation unit 104.

The coordinate transformation unit 104 calculates the transformed coordinate data 505 from the coordinate data 504, and outputs the transformed coordinate data 505 to the polygon removal determining unit 105.

The polygon removal determining unit 105 stores the transformed coordinate data 505 in the transformed coordinate buffer 110. As described above, since a polygon is composed of three vertices in this embodiment, the transformed coordinate buffer 110 can store three pieces of transformed coordinate data 506. The transformed coordinate buffer 110 is controlled with the FIFO (First In First Out) method, and the input coordinate data is sequentially stored. The coordinate data that is not necessary for the polygon removal determination any longer is deleted from the transformed coordinate buffer 110, and the transformed coordinate data corresponding to the valid vertex is output to the form data loading unit 107.

The polygon removal determining unit 105 determines whether the polygon is valid or not by the clipping determination and the culling determination using the transformed coordinate data stored in the transformed coordinate buffer 110. Subsequently, the polygon removal determining unit 105 outputs the valid polygon rendering flag 507 to the vertex removal determining unit 106 according to the result of determination.

The vertex removal determining unit 106 stores the valid polygon rendering flag 507 in the vertex removal determination buffer 111. The vertex removal determination buffer 111 is also controlled with the FIFO method, and the valid polygon rendering flags are sequentially deleted from older valid polygon rendering flags when registering new valid polygon rendering flags to the stored valid polygon rendering flag 508. The vertex removal determining unit 106 generates the valid vertex flag 509 using the valid polygon rendering flag 508. As described above, the valid vertex flag 509 is generated using the equation 1. The vertex removal determining unit 106 outputs the generated valid vertex flag 509 to the form data loading unit 107.

Note that the vertex removal determination buffer 111 is controlled to hold only the valid polygon rendering flags of all of the polygons including the vertex to be determined (three polygons in FIG. 7). This is because, with the polygon strip format, the polygons are rendered in the order of the specifying vertices, and the vertex removal determination buffer 111 is controlled with the FIFO method. Accordingly, the vertex removal determining unit 106 can always generate the valid vertex flag by performing the logical OR operation between the valid polygon rendering flags 508 (two in FIG. 7).

The form data loading unit 107 refers to the valid vertex flag 509, and only when the vertex is valid, accesses the form data list 502 on the memory 200 to load the form data of the appropriate vertex. Subsequently, the form data loading unit 107 receives the transformed coordinate data 510 of the appropriate vertex from the transformed coordinate buffer 110, and outputs the transformed coordinate data 510 together with the form data as the vertex data 511 to the polygon rendering unit 108.

The polygon rendering unit 108 renders polygons using the vertex data 511, and generates the output image 503 on the memory 200.

As described above, controlling the transformed coordinate buffer 110 and the vertex removal determination buffer 111 with the FIFO method allows controlling the coordinate data loading process, the coordinate transformation process, the polygon removal determination process, the vertex removal determination process, the form data loading process, and the polygon rendering process in the pipeline.

This significantly reduces the amount of access to the memory 200, preventing the memory bandwidth from being pressed, and thereby, real-time, high-definition polygon rendering is achieved.

(Polygon Fan Format)

The following is the description for a case where the input polygon model is composed in the polygon fan format.

Figure 8:
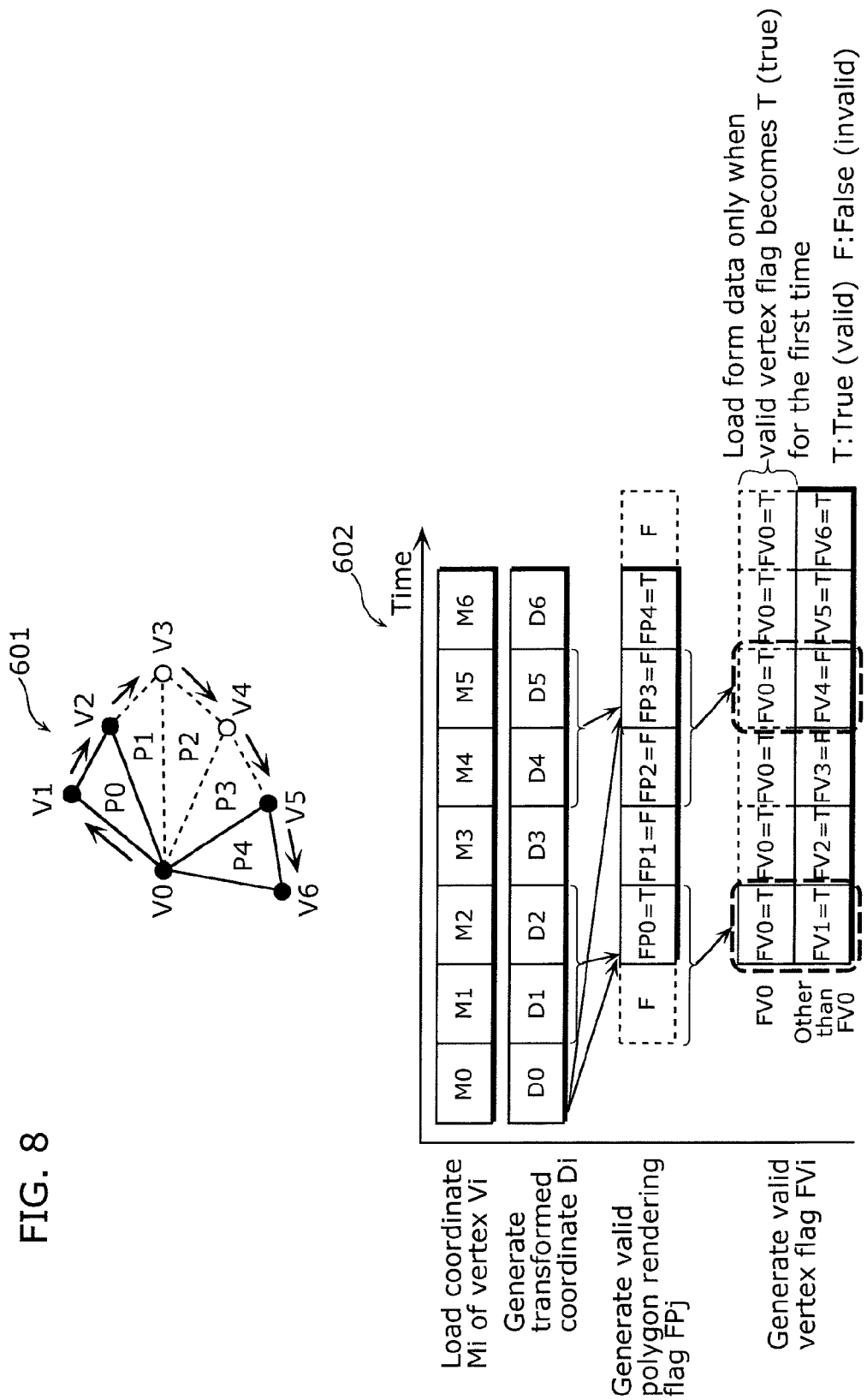
FIG. 8 indicates the process flow in the polygon fan format.

FIG. 8 shows the process flow when the input polygon model is composed in the polygon fan format. The polygon fan format is a format where the polygons are successively rendered while sharing the vertices in the same manner as the polygon strip format described above. The polygon fan format differs from the polygon strip format in that the staring vertex is shared with all of the polygons. As shown in FIG. 8, the polygon Pj (j=0 to 4) of the polygon fan 601 is composed of three vertices, namely, the vertex V0, Vj+1, and Vj+2. Furthermore, the vertex data of the polygon fan 601 is specified in the order of V0→V1→V2→V3→V4→V5→V6. Note that, in FIG. 8, it is assumed that the polygons P0 and P4 are the valid polygons.

The time chart 602 is a time chart which indicates the process flow from loading the coordinate data to generating the valid vertex flag. The following describes the process flow with the polygon fan format with reference to the time chart 602.

The coordinate data loading unit 103 sequentially loads, as described in the process for the polygon strip, the coordinate data Mi (i=0 to 6) in the vertex data in the order specified by the vertex data, and outputs the coordinate data Mi to the coordinate transformation unit 104. The coordinate transformation unit 104 transforms the coordinate of the coordinate data Mi of the vertex Vi (i=0 to 6) received from the coordinate data loading unit 103. With this, the coordinate transformation unit 104 outputs the transformed coordinate data Di to the polygon removal determining unit 105. The polygon removal determining unit 105 causes the transformed coordinate buffer 110 to hold the input transformed coordinate data Di.

The polygon removal determining unit 105 determines polygons to be removed in the order of P0→P1→P2→P3→P4. When determining whether the polygon Pj is removed or not, the polygon removal determining unit 105 causes the transformed coordinate buffer 110 to hold the transformed coordinate data generated by the coordinate transformation unit 104 until the transformed coordinate data D0, Dj, Dj+1 of the vertices V0, Vj, Vj+1, composing the polygon Pj are all calculated. The polygon removal determining unit 105 determines the polygons to be removed using the transformed coordinate data when all of the transformed coordinate data is calculated, and generates the valid polygon rendering flag FPj (true if the polygon is valid, false if the polygon is invalid).

The vertex removal determining unit 106 determines the vertex to be removed in the order of V0→V1→V2→V3→V4→V5→V6. The vertex removal determining unit 106 determines the vertex to be removed using different conditional expressions for the starting vertex V0 and the vertices Vi (i=1 to 6) excluding the starting vertex V0, respectively.

When determining whether the starting vertex V0 is removed or not, the vertex removal determining unit 106 determines that the starting vertex V0 is valid when any of the valid polygon rendering flag FPj becomes true. The valid vertex flag FV0 indicating whether the staring vertex V0 is valid or not is generated based on the conditional expression shown in the equation 2.

$$FV0 = (\exists j)(FPj) \tag{Equation 2}$$

More specifically, the valid vertex flag FV0 is calculated by performing a logical OR operation shown in the equation 3.

$$FV0 = FV0 \| FPj \tag{Equation 3}$$

The vertex removal determining unit 106 causes the vertex removal determination buffer 111 to hold the logical OR of the valid polygon rendering flag as the intermediate result flag (FV0 on the right-hand side of the equation 3). The vertex removal determining unit 106 determines that the starting vertex V0 is valid vertex data when the intermediate result flag becomes true. When the intermediate result flag does not become to be true until the end, the vertex removal determining unit 106 determines that the starting vertex V0 is invalid vertex data.

The vertex removal determining unit 106 performs logical OR operation between the valid polygon rendering flags FPi−2 and FPi−1 of the polygons Pi−2 and Pi−1 which include the vertex Vi excluding the staring vertex V0 (the valid polygon rendering flag with the polygon number that does not exist is treated as false). More specifically, the valid vertex flag FVi which indicates whether the vertex Vi excluding the starting vertex V0 is valid or not is generated based on the following equation 4.

$$FVi = FPi \| FPi-1 \tag{Equation 4}$$

Note that the vertex removal determining unit 106 causes the vertex removal determination buffer 111 to hold the valid polygon rendering flag generated by the polygon removal determining unit 105 or its intermediate logical OR, until the valid polygon rendering flags FPi−2, FPi−1 are calculated. For example, the vertex V2 is determined to be valid vertex data since polygon rendering is valid for the polygon P0, among the polygons P0 and P1 which include the vertex V2. On the other hand, the vertex V3 is determined to be invalid vertex data since polygon rendering is invalid for both the polygon P1 and P2 which include the vertex V3.

The form data loading unit 107 loads the form data of the vertices that has been determined to be valid by the vertex removal determining unit 106, namely, the vertices V0, V1, V2, V5, and V6 in the order of vertex removal determination, and outputs the form data together with the transformed vertex data of the appropriate vertices to the polygon rendering unit 108. The polygon rendering unit 108 receives the vertex data and renders the polygons.

Note that, the process described above is performed in the pipeline, in the same manner as shown in the polygon strip format. More specifically, as shown in the time chart 602 in FIG. 8, the coordinate data is loaded, starting from the vertex V0, and the transformed coordinate data is generated by transforming the loaded coordinate data. The polygon removal determination and the vertex removal determination are performed only after the transformed coordinate data corresponding to the vertex V2 is generated. Subsequently, the coordinate transformation, the polygon removal determination, and the vertex removal determination are performed every time the coordinate data is loaded. The following describes the processes being performed in the pipeline, based on the data flow in each processing unit in the image generating apparatus 100 according to this embodiment.

Figure 9:
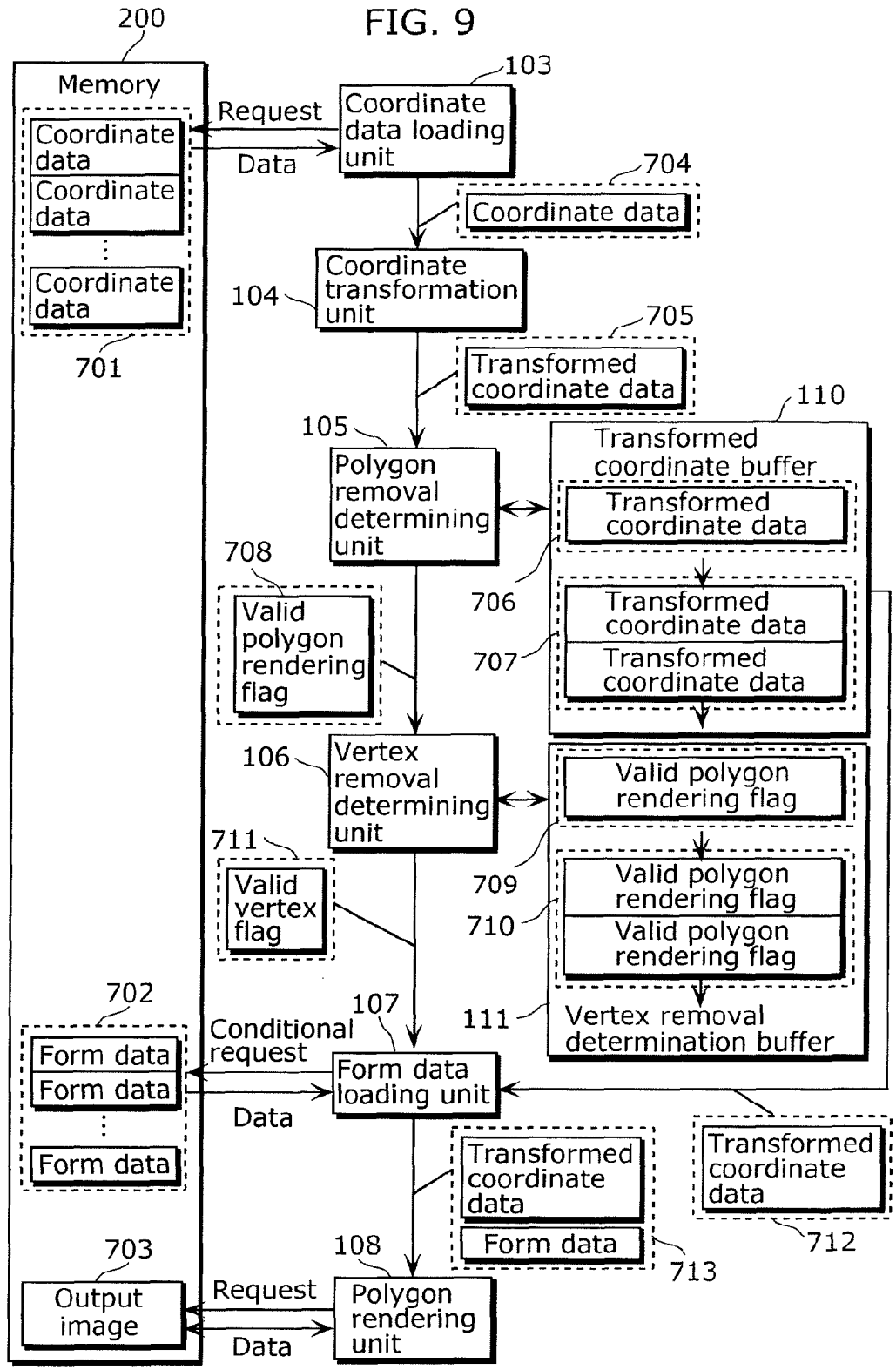
FIG. 9 indicates the data flow in each processing unit in the image generating apparatus compliant with the polygon fan format.

FIG. 9 shows the data flow in each processing unit in the image generating apparatus compliant with the polygon fan format. As shown in FIG. 9, it is assumed that the coordinate data list 701 and the form data list 702 of the polygon fan are provided on the memory 200. The memory 200 also holds the output image 703 output by the polygon rendering unit 108.

The coordinate data loading unit 103 accesses the coordinate data list 701 on the memory 200, sequentially loads the coordinate data 704, and outputs the coordinate data 704 to the coordinate transformation unit 104.

The coordinate transformation unit 104 calculates the transformed coordinate data 705 from the coordinate data 704, and outputs the transformed coordinate data 705 to the polygon removal determining unit 105.

The polygon removal determining unit 105 stores the transformed coordinate data 705 in the transformed coordinate buffer 110. The transformed coordinate buffer 110 stores the transformed coordinate data 706 of the starting vertex V0 of the polygon fan 601, and the transformed coordinate data 707 of the vertex Vi excluding the starting vertex V0. The transformed coordinate data 706 is being held while the polygon fan is processed. The new transformed coordinate data other than the starting vertex is sequentially stored as the transformed coordinate data 707, and is deleted from the transformed coordinate buffer 110 when it becomes unnecessary, sequentially from older transformed coordinate data. Note that, the area in the transformed coordinate buffer 110 where the transformed coordinate data 707 is held is controlled with the FIFO method.

The polygon removal determining unit 105 determines whether the polygon is valid or not by performing the clipping determination and the culling determination using the transformed coordinate data 706 and 707. Subsequently, the polygon removal determining unit 105 generates the valid polygon rendering flag 708 and outputs the valid polygon rendering flag 708 to the vertex removal determining unit 106 according to the result of determination.

The vertex removal determining unit 106 stores the valid polygon rendering flag 708 in the vertex removal determination buffer 111. The vertex removal determination buffer 111 stores the intermediate result flag 709 of the starting vertex of the polygon fan and the valid polygon rendering flag 710 used for determining vertex removal of the vertices other than the starting vertex. The vertex removal determination buffer 111 holds the intermediate result flag 709 of the starting vertex of the polygon fan while the polygon fan is processed. When registering a new valid polygon rendering flag in the valid polygon rendering flag 710, the valid polygon rendering flags are sequentially deleted from the older valid polygon rendering flag. Note that, the area in the vertex removal determination buffer 111 where the valid polygon rendering flag 710 is held is controlled with the FIFO method.

The vertex removal determining unit 106 resets the intermediate result flag 709 to false when the polygon fan rendering is started, in the case where removal of the starting vertex of the polygon fan is determined. Subsequently, each time the valid polygon rendering flag 708 is received, the intermediate result flag 709 is updated by performing a logical OR operation between the intermediate result flag 709 and the new valid polygon rendering flag 708 based on the equation 3. When the intermediate result flag 709 changes from false to true for the first time as a result of the updating, the vertex removal determining unit 106 generates the valid vertex flag 711 indicating true, and outputs the valid vertex flag 711 to the form data loading unit 107.

When determining removal of a vertex other than the starting vertex, the vertex removal determining unit 106 generates the valid vertex flag 711 by performing a logical OR operation between the valid polygon rendering flags 710 and outputs the valid vertex flag 711 to the form data loading unit 107.

Note that, the vertex removal determination buffer 111 is controlled such that only the intermediate result flag of the starting vertex of the polygon fan and the valid polygon rendering flag of all of the polygons (two in FIG. 9) which include vertices to be determined. This is because, with the polygon fan format, the polygon is rendered in the order of specifying the vertices, in the same manner as the polygon strip format, and the area in the vertex removal determination buffer 111 where the valid polygon rendering flag is held is controlled with the FIFO method. Accordingly, the vertex removal determining unit 106 can generate the valid vertex flag by always performing the logical OR operation between the valid polygon rendering flags 710 (two in FIG. 9) stored in the vertex removal determination buffer.

The form data loading unit 107 refers to the valid vertex flag 711, and, only when the vertex is valid, accesses the form data list 702 on the memory 200 to load the form data of the appropriate vertex. Subsequently, the form data loading unit 107 receives the transformed coordinate data 712 of the appropriate vertex from the transformed coordinate buffer 110, and outputs the transformed coordinate data 712 together with the form data as the vertex data 713 to the polygon rendering unit 108.

The polygon rendering unit 108 renders polygons using the vertex data 713, and generates the output image 703 on the memory 200.

As described above, storing the transformed coordinate data 707 and the valid polygon rendering flag 710 corresponding to the vertices excluding the starting vertex in a buffer controlled with the FIFO method allows controlling the coordinate data loading process, the coordinate transformation process, the polygon removal determination process, the vertex removal determination process, the form data loading process, and the polygon rendering process in the pipeline.

This significantly reduces the amount of access to the memory 200, preventing the memory bandwidth from being pressed, and thereby, real-time, high-definition polygon rendering is achieved.

(Polygon Mesh Format)

Figure 10:
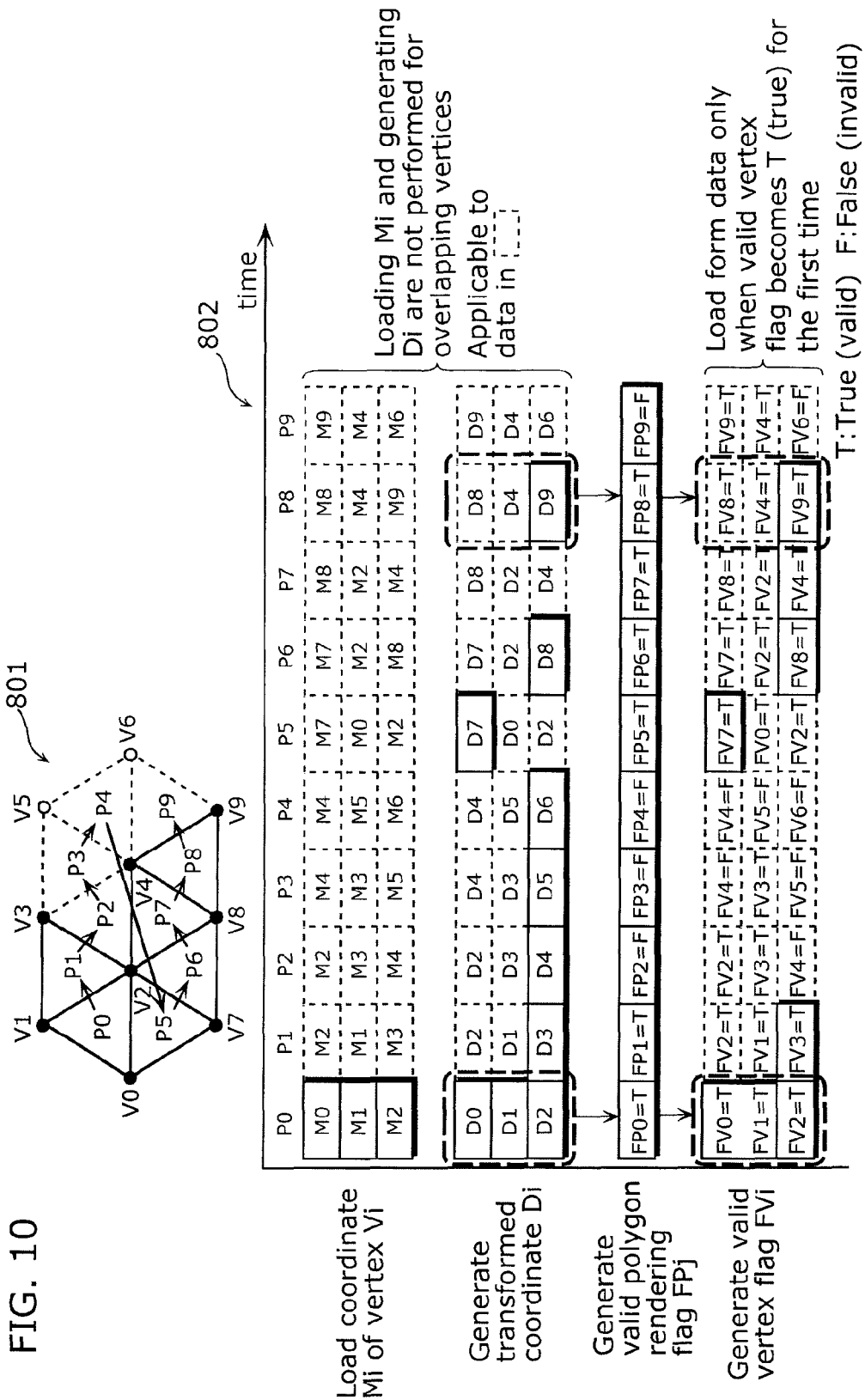
FIG. 10 indicates the process flow in the polygon mesh format.

FIG. 10 shows the process flow when the input polygon model is composed in the polygon mesh format. With the polygon mesh format, although vertices are shared in many polygons within, vertices are specified per polygon, unlike the polygon strip format and the polygon fan format described above.

As shown in FIG. 10, for example, the vertex data of the polygon mesh 801 is specified in the order of P0 (V0, V1, V2)→P1 (V2, V1, V3)→P2 (V2, V3, V4)→P3 (V4, V3, V5)→P4 (V4, V5, V6)→P5 (V7, V0, V2)→P6 (V7, V2, V8)→P7 (V8, V2, V4)→P8 (V8, V4, V9)→P9 (V9, V4, V6). However, the polygon mesh format is highly flexible, and thus the vertex data may not be necessarily specified in this order. Note that, in the example shown in FIG. 10, it is assumed that the polygons P0, P1, P5, P6, P7, and P8 are valid polygons, and the polygons P2, P3, P4, and P9 are invalid polygons.

The time chart 802 is a time chart which indicates the process flow from loading the coordinate data to generating the valid vertex flag (vertex determination). The following describes the process flow with the polygon mesh format with reference to the time chart 802.

The coordinate data loading unit 103 sequentially loads, in the order specified by the vertex data, the coordinate data Mi (i=0 to 9) in the vertex data, and outputs the coordinate data Mi to the coordinate transformation unit 104. Here, in order to prevent the overlapped loading of the same vertex on the polygon mesh, the vertices whose transformed coordinate data is held on the transformed coordinate buffer 110 are not loaded.

The coordinate transformation unit 104 transforms the coordinate of the coordinate data Mi of the vertex Vi received from the coordinate data loading unit 103, and generates the transformed coordinate data Di in the order of inputting the coordinate data.

The polygon removal determining unit 105 causes the transformed coordinate buffer 110 to hold the input transformed coordinate data Di. Subsequently, the polygon removal determining unit 105 determines polygons to be removed in the order of P0→P1→P2→P3→P4→P5→P6→P7→P8→P9. When determining whether the polygon Pj (j=0 to 9) is removed or not, the polygon removal determining unit 105 causes the transformed coordinate buffer 110 to hold the transformed coordinate data generated by the coordinate transformation unit 104 until the transformed coordinate data Dk, Dl, Dm (k, l, m=0 to 9) of the vertices Vk, Vl, Vm, composing the polygon Pj are all calculated. The polygon removal determining unit 105 determines the polygons to be removed using the transformed coordinate data when all of the transformed coordinate data is calculated, and generates the valid polygon rendering flag FPj (true if the polygon is valid, false if the polygon is invalid).

Here, in the case of polygon mesh format, the same vertex is usually shared with another polygon. For this reason, even after the polygon removal determination of the polygon Pj, the transformed coordinate data Dk, Dl, Dm is held while the polygon removal determination for the neighboring polygons are performed (for example, during a period where the valid polygon rendering flag FPj indicated in the time chart 802 in FIG. 10 is calculated). The coordinate data loading unit 103 does not load the coordinate data of the vertex whose transformed coordinate data is held, and the polygon removal determining unit 105 uses the transformed coordinate data being held for the polygon removal determination again.

For example, when determining polygon removal of the polygon P8, the coordinate data loading unit 103 loads the coordinate data M9 of the vertex V9 among the vertices V8, V4, and V9, composing the polygon P8 and the coordinate transformation unit 104 generates the transformed coordinate data D9. On the other hand, regarding the vertices V8 and V4, the transformed coordinate data D8 and D4 is already held in the transformed coordinate buffer 110. Thus, the coordinate data loading unit 103 does not load the coordinate data of the vertices V8 and V4, and the coordinate transformation unit 104 does not generate the transformed coordinate data D8 and D4. The polygon removal determining unit 105 determines the polygon to be removed using the newly generated transformed coordinate data D9 and the transformed coordinate data D8 and D4 that has already been held.

The vertex removal determining unit 106 determines whether the vertex Vi is removed or not using the valid polygon rendering flag FPj. More specifically, as shown in the equation 5, when a valid polygon rendering flag FPj of any polygon including the vertex Vi becomes true, the valid vertex flag FVi of the vertex Vi is set to be true.

$$FVi = (\exists i (FPj \ \& \ (Vi \in Pj))) \quad \text{(Equation 5)}$$

More specifically, when determining vertex removal of the vertex Vi (i=0 to 9), the vertex removal determining unit 106 first resets the valid vertex flag FVi to false. The vertex removal determining unit 106 receives the valid polygon rendering flags FPj generated by the polygon removal determining unit 105 in the order of V0→V1→V2→V3→V4→V5→V6→V7→V8→V9, performs the logical OR operation between the valid polygon rendering flags FPj and the intermediate result flags FVk, FVl, FVm (k, l, m=0 to 9) of the vertices Vk, Vl, Vm composing the polygon Pj (j=0 to 9) respectively, and updates the intermediate result flags FVk, FVl, FVm (updating is performed in the order of specifying vertices, namely, FVk→FVl→FVm. More specifically, the intermediate result flag FVk (the same applies to FVl and FVm) is calculated based on the following equation 6, each time the valid polygon rendering flag FPj is received.

$$FVk = FVk \| (FPj \ \& \ (Vk \in Pj)) \quad \text{(Equation 6)}$$

For example, the following describes a case where the polygon removal determining unit 105 generates the valid polygon rendering flag FP8 of the polygon P8. The vertex removal determining unit 106 performs the logical OR operation between the intermediate result flags FV8, FV4, FV9 and the valid polygon rendering flag FP8 for the vertices V8, V4, and V9 composing the polygon P8, and updates the intermediate result flags FV8, FV4, and FV9. The vertex is determined to be the valid vertex data at the point in time when the intermediate result flag FVi changes from false to true. In the example in FIG. 10, the vertices are determined to be the valid vertex data in the order of V0→V1→V2→V3→V7→V8→V4→V9. The vertices V5 and V6 whose the intermediate result flags FVi do not become to be true until the end are determined to be the invalid vertex data.

The form data loading unit 107 loads the form data of the vertices that have been determined to be valid by the vertex removal determining unit 106, namely, the vertices V0, V1, V2, V3, V7, V8, V4, and V9 in the order of vertex removal determination, and outputs the form data together with the transformed vertex data of the appropriate vertices to the polygon rendering unit 108. The polygon rendering unit 108 receives the vertex data and renders the polygons.

As described above, even when the input polygon model is represented in the polygon mesh format, the form data is loaded only when it is necessary for rendering the polygon. Therefore, it is possible to reduce the memory access compared to the case where all data is loaded.

The following describes the processes being performed in the pipeline, based on the data flow in each processing unit in the image generating apparatus 100 according to this embodiment.

Figure 11:
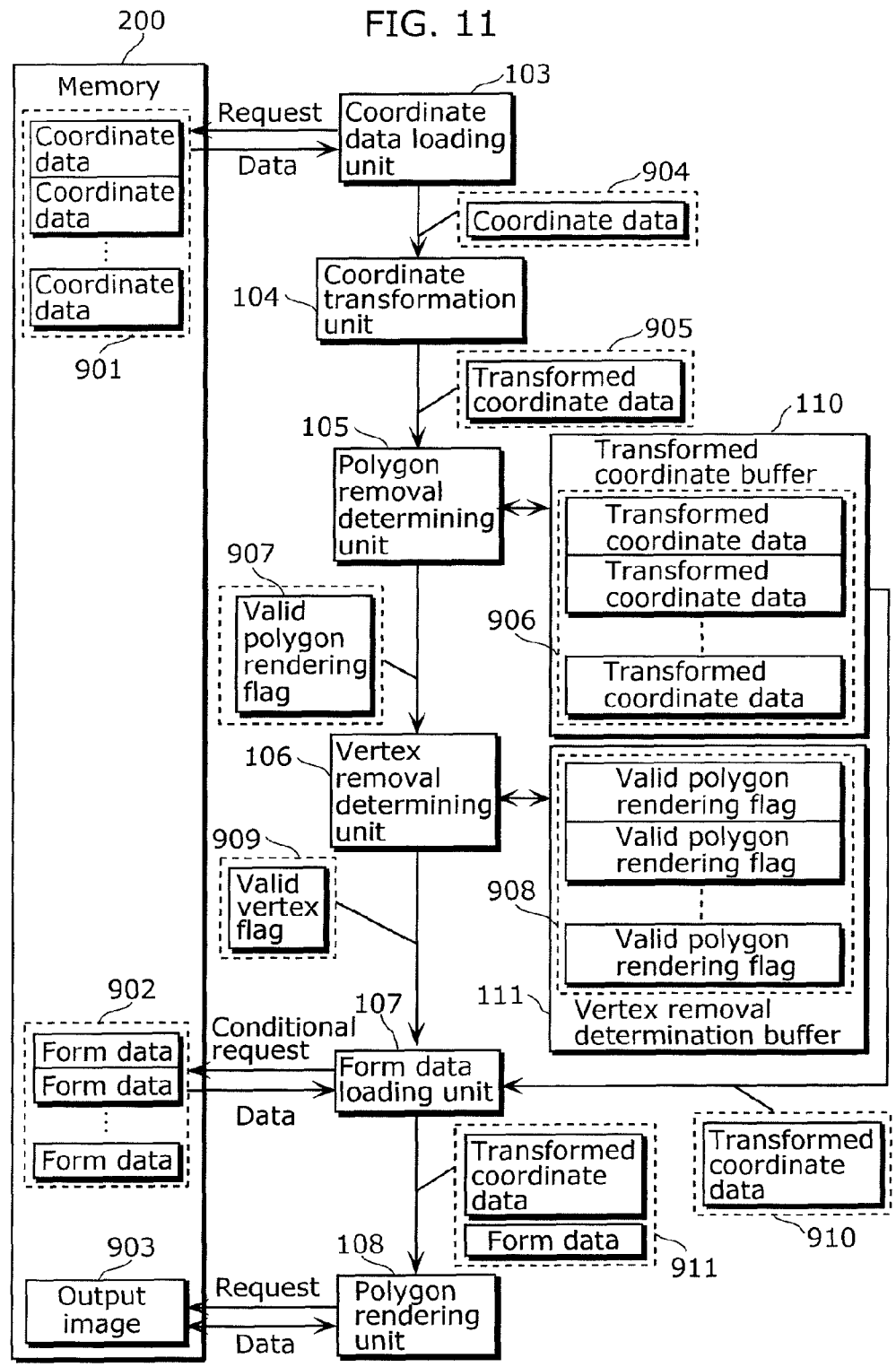
FIG. 11 indicates the data flow in each processing unit in the image generating apparatus compliant with the polygon mesh format.

FIG. 11 shows the data flow in each processing unit in the image generating apparatus compliant with the polygon mesh format. As shown in FIG. 11, it is assumed that the coordinate data list 901 and the form data list 902 of the polygon mesh are provided on the memory 200. The memory 200 also holds the output image 903 output by the polygon rendering unit 108.

The coordinate data loading unit 103 accesses the coordinate data list 901 on the memory 200, loads the coordinate data 904, and outputs the coordinate data 904 to the coordinate transformation unit 104. Here, in order to prevent the overlapped loading of the same vertex on the polygon mesh, the vertices whose transformed coordinate data is held on the transformed coordinate buffer 110 are not loaded.

The coordinate transformation unit 104 calculates the transformed coordinate data 905 from the coordinate data 904, and outputs the transformed coordinate data 905 to the polygon removal determining unit 105.

The polygon removal determining unit 105 stores the transformed coordinate data 905 in the transformed coordinate buffer 110. The transformed coordinate buffer 110 registers as many transformed coordinate data 906 as the maximum number of the transformed coordinate data allowed to be registered. When registering the new transformed coordinate data after the number of registered transformed coordinate data reaches the maximum number, the transformed coordinate data of the vertex which has the oldest reference is deleted from the transformed coordinate buffer 110. The polygon removal determining unit 105 generates the valid polygon rendering flag 907 using the transformed coordinate data 906, and outputs the valid polygon rendering flag 907 to the vertex removal determining unit 106.

The vertex removal determining unit 106 stores, in the vertex removal determination buffer 111, the intermediate result flag generated from the valid polygon rendering flag 907. The vertex removal determination buffer 111 registers the intermediate result flag 908 as many as the maximum number of intermediate flags allowed to be registered (as many as the number of transformed coordinate data in the transformed coordinate buffer 110). When registering the new intermediate result flag after the number of registered intermediate result flags reaches the maximum number, the intermediate result flag of the vertex which has the oldest reference is deleted from the vertex removal determination buffer 111. The vertex removal determining unit 106 resets all of the intermediate result flags 908 to false when starting rendering of the polygon mesh. Subsequently, the vertex removal determining unit 106 updates the intermediate result flag 908 each time the new valid polygon rendering flag 907 is received, by performing, based the equation 6, a logical OR operation between the new valid polygon rendering flag 907 and the intermediate result flag 908 of the vertex included in the applicable polygon. When the updating result changes from false to true for the first time, the vertex removal determining unit 106 generates the valid vertex flag indicating that the applicable vertex is true and outputs the valid vertex flag to the form data loading unit 107.

The form data loading unit 107 refers to the valid vertex flag 909, and only when the vertex is valid, accesses the form data list 902 on the memory 200 to load the form data of the appropriate vertex. The form data loading unit 107 receives the transformed coordinate data 910 of the appropriate vertex from the transformed coordinate buffer 110, and outputs the transformed coordinate data 910 together with the form data as the vertex data 911 to the polygon rendering unit 108.

The polygon rendering unit 108 renders polygons using the vertex data 911, and generates the output image 903 on the memory 200.

As described above, even when the input polygon model is represented in the polygon mesh format, the form data is loaded only when it is necessary for rendering the polygon. Therefore, it is possible to reduce the memory access compared to the case where all data is loaded.

According to the image generating apparatus and the image generating method of this embodiment, regarding the form data in the vertex data of the input polygon model other than the coordinate data, only the form data corresponding to the vertices determined to be valid in the vertex removal determination is loaded. Accordingly, it is possible to significantly reduce the memory access amount for loading the vertex data of the input polygon model from the memory to the graphics processing unit, and thereby, real-time, high-definition polygon rendering with a large number of input polygons can be achieved by an information processing apparatus with a low memory bandwidth.

Although only an exemplary embodiment of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

For example, the input polygon model may be represented in the mixture of the forms described above, or may include other representation forms such as quadrilateral strips and line strips.

Note that, the data flow in FIG. 11 is described as the data flow when the input polygon model is in the polygon mesh format, however, the polygon strip format and the polygon fan format, or mixture of these forms can be processed in the same data flow.

Further, although the polygon removal determining unit 105 uses the clipping determination and the culling determination, the polygon removal determining unit 105 may use only one of them depending on a rendering option.

Furthermore, a removal determination having any planar surface in the three dimensional space as a boundary, and a removal determination having any area on the displayed surface 303 as a boundary may also be included as the clipping determination.

Furthermore, a removal determination of a polygon smaller than 1 dot when projected on the displayed surface 303, and a removal determination of the polygon that becomes completely not visible from the viewpoint 301 due to the rendering of another polygon in the viewing volume 302 may also be included as the culling determination.

Furthermore, in this embodiment, the vertex removal determining unit 106 generates the valid vertex flag FVi by calculating the logical OR between the valid polygon rendering flags FPj of the polygon including the vertex Vi to be determined. This method includes a method where the valid vertex flag FVi is generated after all of the valid polygon rendering flags FPj of the polygon including the vertex Vi to be determined are obtained from the polygon removal determining unit 105, and a method where the valid polygon rendering flag FPj is sequentially updated by calculating the logical OR with the intermediate result of the valid vertex flag FVi, and generates the valid vertex flag FVi as true when the logical OR changes from false to true. In this embodiment, the former applies to the vertices in the polygon strip format and the vertices other than the starting vertex in the polygon fan format. The latter applies to the starting vertex of the polygon fan and the vertices of the polygon mesh. However, either method may be used regardless of the representation form of the input polygon model.

Furthermore, in the polygon mesh format, when the intermediate result flag changes from false to true, the vertex removal determining unit 106 may stop performing a logical OR operation using a true intermediate result flag. For example, deleting the true intermediate result flags in the vertex removal determination buffer 111 stops the logical OR operation between the deleted intermediate result flags and the valid polygon rendering flags.

For example, each block included in the image generating apparatus 100 in FIG. 2 such as the coordinate data loading unit 103 and the coordinate transformation unit 104 maybe partly or fully parallelized, and multiple blocks may also be integrated into one block.

Furthermore, the present invention may be implemented as an information processing apparatus including the image generating apparatus 100 in FIG. 2.

Figure 12:
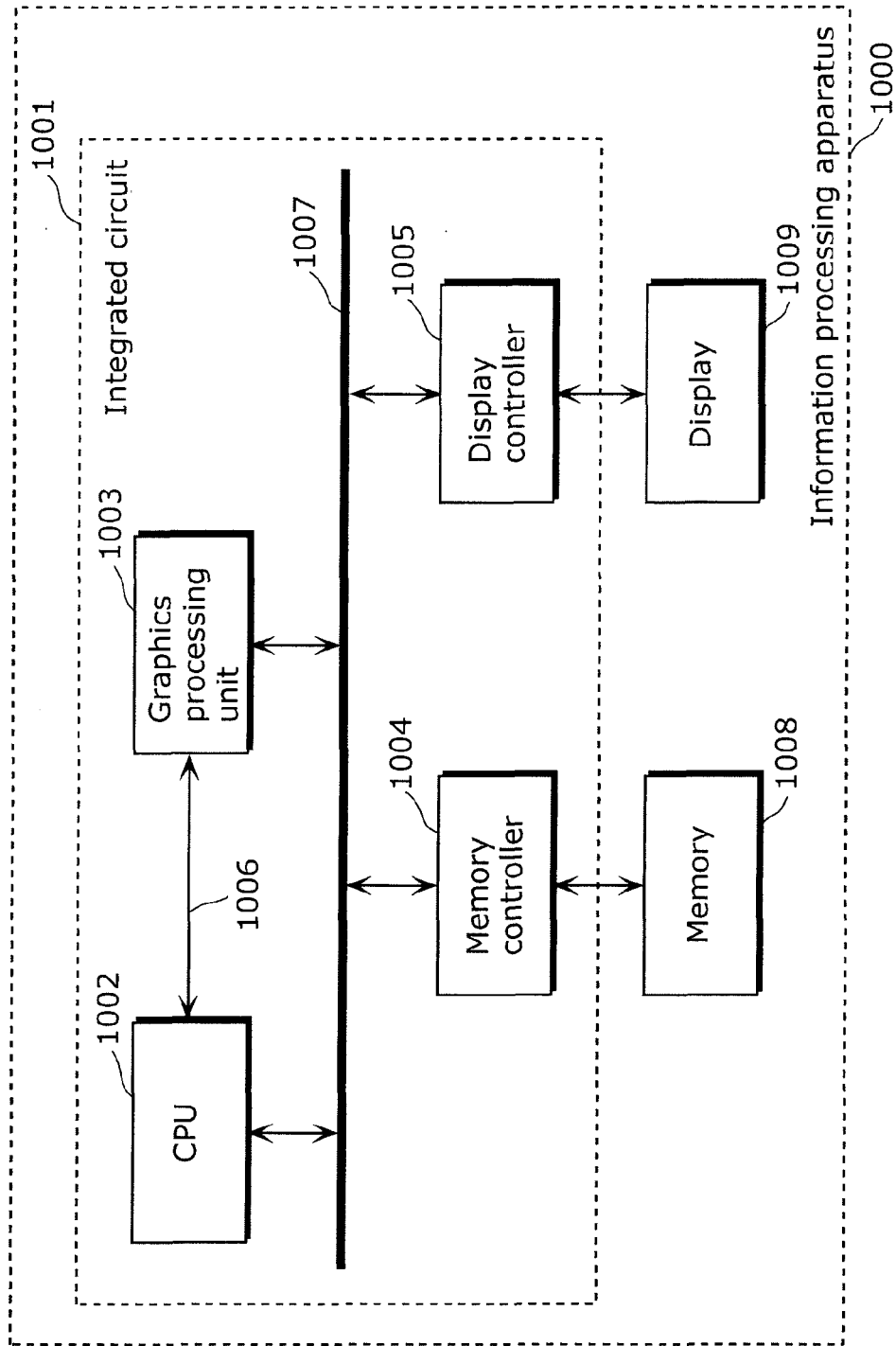
FIG. 12 is a block diagram indicating the structure of the image processing apparatus provided with the image generating apparatus according to the embodiment.

FIG. 12 is a block diagram showing the structure of the information processing apparatus including the image generating apparatus in FIG. 2. The information processing apparatus 1000 shown in FIG. 12 includes the integrated circuit 1001, the memory 1008, and the display 1009.

The integrated circuit 1001 is, for example, a system LSI and others, and includes the CPU 1002, the graphics processing unit 1003 (the image generating apparatus in FIG. 2), the memory controller 1004, the display controller 1005, the CPU bus 1006, and the memory bus 1007.

The CPU 1002 stores the rendering instruction list 202 and the vertex data list 203 in the memory 1008 via the memory bus 1007 and the memory controller 1004. Furthermore, the CPU 1002 transmits the instruction for rendering to the graphics processing unit 1003 via the CPU bus 1006.

The graphics processing unit 1003 accesses the rendering instruction list 202 and the vertex data list 203 via the memory bus 1007 and the memory controller 1004 and performs the image generating process described above. The generated image is stored in the memory 1008 via the memory bus 1007 and the memory controller 1004. The generated image stored in the memory 1008 is output to the display 1009 via the display controller 1005.

Note that, regarding the storage of the vertex data list 203 in the memory 1008, the vertex data list 203 may be divided into the coordinate data list 205 that is always loaded and the form data list 206 that is not loaded depending on the result of the vertex removal determination and store them in separate memory areas. This prevents the loading of the form data that is determined to be unnecessary from being loaded together with the coordinate data when the memory bus 1007 and the memory controller 1004 load the vertex data list 203 on the memory 1008 by the burst memory access, and thereby increasing efficiency in memory access.

Furthermore, each functional block in the integrated circuit 1001 in FIG. 11 such as the CPU 1002 and the graphics processing unit 1003 may be individually integrated into a circuit, or maybe one integrated circuit including a part of or all of the functional blocks. The integrated circuit 1001 may include other functional blocks such as AV (Audio Visual) processing unit and a streaming processing unit. The memory 1008 may be incorporated in the integrated circuit 1001, or provided in multiple numbers either within or outside the integrated circuit 1001.

Furthermore, although an example where the image generating apparatus is implemented as an integrated circuit is described in this embodiment, the image generating apparatus may be achieved by a program on a general-purpose processor, or using a FPGA (Field Programmable Gate Array) capable of changing hardware configuration after manufacturing, or a reconfigurable processor whose internal connection of circuit cells and setting are reconfigurable.

Furthermore, the present invention may be implemented as a recording medium such as a computer-readable CD-ROM (Compact Disc-Read Only Memory) on which the program is recorded, and information, data, or signals indicating the program. The program, information, data and signals may be distributed via a communication network such as the Internet.

The image generating method and the image generating apparatus according to the present invention are applicable to various electronic devices incorporated with graphics rendering function. For example, the image generating method and the image generating apparatus are applicable to mobile phones, PDA (Personal Digital Assistant), digital televisions, car navigation systems, home-use game consoles, personal computers, and others.

The invention claimed is:

1. An image generating apparatus, comprising:
a memory interface configured to connect to a non-transitory memory for loading data;
a coordinate data loading unit configured to load coordinate data from vertex data stored in the memory, the vertex data indicating information of a vertex, and the coordinate data indicating a position of the vertex;
a coordinate transformation unit configured to transform a coordinate of the coordinate data loaded by the coordinate data loading unit into a coordinate in a different coordinate system;
a determining unit configured to determine whether the vertex is valid or not by determining whether at least one polygon among one or more polygons having the vertex is to be rendered or not;
a form data loading unit configured to load form data different from the coordinate data from the vertex data when it is determined that the vertex is valid; and
a polygon rendering unit configured to render the polygon using the form data loaded by the form data loading unit and the transformed coordinate data, when it is determined that the vertex is valid,
wherein the determining unit includes:
a polygon determining unit configured to determine whether or not each of the one or more polygons having the vertex is to be rendered and to output a valid polygon flag indicating whether or not the polygon is to be rendered; and
a vertex determining unit configured to determine, when an output of a plurality of valid polygon flags is provided from the polygon determining unit, whether or not the vertex is valid by performing a logical OR operation between the plurality of valid polygon flags.

2. The image generating apparatus according to claim 1, wherein transforming the coordinate by the coordinate transformation unit, and determining the polygon and determining the vertex by the determining unit are performed in a pipeline each time a piece of the coordinate data is loaded.

3. The image generating apparatus according to claim 1, further comprising
a first buffer which holds an intermediate result flag which is set, in advance to indicate that the vertex is invalid,
the vertex determining unit is configured to (i) update, for each of the one or more polygons having the vertex, the intermediate result flag according to the result of a logical OR operation between the valid polygon flag and the intermediate result flag, and (ii) determine whether or not the vertex is valid based on the updated intermediate result flag.

4. The image generating apparatus according to claim 3, wherein the vertex determining unit is configured to perform a logical OR operation between the intermediate result flag and the valid polygon flag, and to output a valid vertex flag indicating that the vertex is valid when a value of the intermediate result flag changes, and
the form data loading unit is configured to load the form data corresponding to the valid vertex flag, when the valid vertex flag is received.

5. The image generating apparatus according to claim 4, wherein the vertex determining unit is further configured to stop performing the logical OR operation when the value of the intermediate result flag changes.

6. The image generating apparatus according to claim 1, wherein the coordinate data loading unit is configured to load the coordinate data from an area where only a plurality of pieces of the coordinate data is stored, and
the form data loading unit is configured to load the form data from an area where only a plurality of pieces of the form data is stored.

7. The image generating apparatus according to claim 1, wherein the coordinate transformation unit is configured to transform the coordinate of the coordinate data into a coordinate in the world coordinate system and in a display coordinate system, and
the determining unit is configured, for each of the one or more polygons having the vertex, to determine whether the polygon is valid or not by performing at least one of a clipping determination using the transformed coordinate data transformed into the coordinate in the world coordinate system and a culling determination using the transformed coordinate data transformed into the coordinate in the display coordinate system, and to determine the vertex to be valid, when it is determined that the at least one polygon among the one or more polygons having the vertex is valid.

8. An image generating method, comprising:
loading, by a device, coordinate data from vertex data stored in a non-transitory memory, the vertex data indicating information of a vertex, and the coordinate data indicating a position of the vertex, the device including a memory interface configured to connect to the non-transitory memory for loading data;
transforming a coordinate of the coordinate data loaded into a coordinate in a different coordinate system;
determining whether the vertex is valid or not by determining whether at least one polygon among one or more polygons having the vertex is to be rendered or not;
loading form data different from the coordinate data from the vertex data when it is determined that the vertex is valid; and
rendering the at least one polygon using the form data loaded and the transformed coordinate data, when it is determined that the vertex is valid,
wherein the determining whether the vertex is valid or not includes:
determining whether or not each of the one or more polygons having the vertex is to be rendered and outputting a valid polygon flag indicating whether or not the polygon is to be rendered; and
determining, when an output of a plurality of valid polygon flags is provided in the determining whether or not the polygon is to be rendered, whether or not the vertex is valid by performing a logical OR operation between the plurality of valid polygon flags.

9. An integrated circuit, comprising:
a memory interface configured to connect to a non-transitory memory for loading data;
a coordinate data loading unit configured to load coordinate data from vertex data stored in the memory, the vertex data indicating information of a vertex, and the coordinate data indicating a position of the vertex;
a coordinate transformation unit configured to transform a coordinate of the coordinate data loaded by the coordinate data loading unit into a coordinate in a different coordinate system;
a determining unit configured to determine whether the vertex is valid or not by determining whether at least one polygon among one or more polygons having the vertex is to be rendered or not;

a form data loading unit configured to load form data different from the coordinate data from the vertex data when it is determined that the vertex is valid; and a polygon rendering unit configured to render the at least one polygon using the form data loaded by the form data loading unit and the transformed coordinate data, when it is determined that the vertex is valid, wherein the determining unit includes:

a polygon determining unit configured to determine whether or not each of the one or more polygons having the vertex is to be rendered and to output a valid polygon flag indicating whether or not the polygon is to be rendered; and a vertex determining unit configured to determine, when an output of a plurality of valid polygon flags is provided from the polygon determining unit, whether or not the vertex is valid by performing a logical OR operation between the plurality of valid polygon flags.

10. The image generating apparatus according to claim 1, wherein the determining unit is configured to determine the vertex to be valid when at least one polygon among the one or more polygons having the vertex is to be rendered, and determine the vertex to be invalid when none of the one or more polygons are to be rendered.

11. The image generating apparatus according to claim 1, wherein the coordinate data loading unit is configured to load only the coordinate data among (i) the coordinate data and (ii) the form data from the vertex data, and after the determining unit determines whether the vertex is valid or not, the form data loading unit is configured to load the form data from the vertex data.

* * * * *